United States Patent
Yerrabommanahalli et al.

(10) Patent No.: US 10,080,119 B2
(45) Date of Patent: Sep. 18, 2018

(54) METHODS, PROCEDURES AND FRAMEWORK TO PROVISION AN ESIM AND MAKE IT MULTI-SIM CAPABLE USING PRIMARY ACCOUNT INFORMATION

(71) Applicant: Apple Inc., Cupertino, CA (US)

(72) Inventors: Vikram B. Yerrabommanahalli, Sunnyvale, CA (US); Li Li, Los Altos, CA (US); Arun G. Mathias, Los Altos, CA (US); Najeeb M. Abdulrahiman, Fremont, CA (US); Chandiramohan Vasudevan, San Jose, CA (US); Rohan C. Malthankar, San Jose, CA (US); Francisco J. Gonzalez, San Jose, CA (US); Rafael L. Rivera-Barreto, Santa Clara, CA (US); Jean-Marc Padova, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/817,081

(22) Filed: Nov. 17, 2017

(65) Prior Publication Data

US 2018/0098178 A1 Apr. 5, 2018

Related U.S. Application Data

(63) Continuation of application No. 15/178,727, filed on Jun. 10, 2016, now Pat. No. 9,843,885.

(Continued)

(51) Int. Cl.
*H04M 1/00* (2006.01)
*H04W 4/60* (2018.01)
(Continued)

(52) U.S. Cl.
CPC ............. *H04W 4/60* (2018.02); *H04L 61/106* (2013.01); *H04W 8/205* (2013.01); *H04W 68/005* (2013.01); *H04W 8/18* (2013.01)

(58) Field of Classification Search
CPC ......... H04W 4/60; H04W 8/205; H04W 8/18; H04W 68/005; H04L 61/106
(Continued)

(56) References Cited

U.S. PATENT DOCUMENTS 8,010,158 B2 * 8/2011 Parkkinen ......... H04M 1/72525
455/417
8,565,196 B2 * 10/2013 Yang .................... H04W 76/15
370/335

(Continued)

FOREIGN PATENT DOCUMENTS

DE 20 2015 102198 5/2015
GB 2522044 A 7/2015
WO 2015180140 A1 12/2015

OTHER PUBLICATIONS

Invitation to Pay Additional Fees and, Where Applicable, Protest Fee for International Application No. PCT/US2016/040297, dated Sep. 22, 2016, pp. 1-8.

(Continued)

*Primary Examiner* — April G Gonzales
(74) *Attorney, Agent, or Firm* — Meyertons Hood Kivlin Kowert & Goetzel, P.C.; Jeffrey C. Hood; Matthew C. Washburn

(57) ABSTRACT

Some embodiments relate to methods for provisioning a secondary wireless device with an eSIM for wireless communication and activating multi-SIM functionality between the secondary wireless device and a primary wireless device having a subscribed SIM. The primary wireless device may act as a proxy in obtaining the eSIM for the secondary wireless device. The primary wireless device may then (Continued)

provide, to the cellular network, identifiers of the SIMs of the primary and secondary wireless devices. The primary wireless device may then request initiation of multi-SIM functionality for the two SIMs, and receive an indication that the multi-SIM functionality has been initiated. As an example, the multi-SIM functionality may be implemented by mapping the SIM of the primary wireless device and the SIM of the secondary wireless device (e.g., the provisioned eSIM) to the same Mobile Directory Number (MDN).

20 Claims, 7 Drawing Sheets

Related U.S. Application Data

(60) Provisional application No. 62/204,431, filed on Aug. 12, 2015.

(51) Int. Cl.
*H04W 8/20* (2009.01)
*H04L 29/12* (2006.01)
*H04W 68/00* (2009.01)
*H04W 8/18* (2009.01)

(58) Field of Classification Search
USPC .......................................................... 455/558
See application file for complete search history.

(56) References Cited

U.S. PATENT DOCUMENTS

| | | | | |
|---|---|---|---|---|
| 8,577,414 | B2 * | 11/2013 | Rajadurai | H04L 63/0815 |
| | | | | 455/41.1 |
| 8,800,015 | B2 * | 8/2014 | Christopher | H04W 76/10 |
| | | | | 726/7 |
| 9,094,899 | B2 * | 7/2015 | Smith | H04W 48/17 |
| 9,137,662 | B2 * | 9/2015 | Holtmanns | H04L 63/0892 |
| 9,161,200 | B2 * | 10/2015 | Guday | H04L 43/045 |
| 9,198,024 | B1 * | 11/2015 | Khalid | H04W 4/20 |
| 9,204,300 | B2 * | 12/2015 | Park | H04W 12/06 |
| 9,326,091 | B2 * | 4/2016 | Donnellan | H04W 4/008 |
| 9,451,098 | B2 * | 9/2016 | Zhu | H04M 15/49 |
| 9,848,325 | B2 * | 12/2017 | Mellqvist | H04W 12/06 |
| 9,860,750 | B2 * | 1/2018 | Goel | H04W 76/38 |
| 9,906,254 | B2 * | 2/2018 | Zhao | H04B 1/3816 |
| 2012/0129500 | A1 * | 5/2012 | Rajadurai | H04L 63/0815 |
| | | | | 455/411 |
| 2013/0196621 | A1 * | 8/2013 | Guday | H04L 43/045 |
| | | | | 455/406 |
| 2013/0227656 | A1 * | 8/2013 | Holtmanns | H04L 63/0892 |
| | | | | 726/4 |
| 2013/0237200 | A1 * | 9/2013 | Nystrom | H04W 8/20 |
| | | | | 455/418 |
| 2013/0340059 | A1 * | 12/2013 | Christopher | H04W 76/10 |
| | | | | 726/7 |
| 2014/0031012 | A1 * | 1/2014 | Park | H04W 12/06 |
| | | | | 455/411 |
| 2014/0101034 | A1 * | 4/2014 | Tanner | G06Q 20/10 |
| | | | | 705/39 |
| 2014/0228039 | A1 * | 8/2014 | Zhao | H04B 1/3816 |
| | | | | 455/450 |
| 2015/0156601 | A1 * | 6/2015 | Donnellan | H04W 4/008 |
| | | | | 455/41.1 |
| 2015/0237597 | A1 * | 8/2015 | Kanamarlapudi | H04W 68/02 |
| | | | | 455/458 |
| 2015/0304506 | A1 * | 10/2015 | Zhu | H04M 15/49 |
| | | | | 455/406 |
| 2016/0014601 | A1 * | 1/2016 | Mellqvist | H04W 12/06 |
| | | | | 455/411 |

OTHER PUBLICATIONS

Sebastian Vitzthum, "o2 Guru Marie erklart im Video: Multicards von o2 online konfigurieren", Aug. 7, 2013, XP055302024, Retrieved from the Internet at URL:https://blog.telefonica.de/2013/08/02-multicard-konfigurieren-und-einstellen-video-anleitung/[retrieved on Sep. 13, 2016], pp. 1-11.
P2deofficial, "So geht's: Multicard von o2 konfigurieren and einstellen: Tipps & Tricks", Youtube, Jul. 12, 2013, XP054976773, Retrieved from the Internet: URL:https://www.youtube.com/watch?v=fuSsZe xw5TM[retrieved on Sep. 13, 2016], pp. 7.
Search Report for Singaporean Patent Application No. 10201605616U, Feb. 13, 2017, 2 pages.
Written Opinion of the International Preliminary Examining Authority for International Application No. PCT/US2016/040297, dated Jul. 6, 2017, pp. 1-11.
02 (Germany) Gmbh & Co. Ohg Kundenbetreuung: "Wegweisend: Ihr Handbuch fur O2 Multicard.", Mar. 31, 2005, pp. 1-23, XP055302012, Retrieved from the Internet: URL:http://mnhsk. homeftp.net/Diverses/02%20Germany%20 Info/Handbuch%2002% 20Multicard/handbuch-multicard.pdf [retrieved on Sep. 13, 2016]; six pages.

* cited by examiner

METHODS, PROCEDURES AND FRAMEWORK TO PROVISION AN ESIM AND MAKE IT MULTI-SIM CAPABLE USING PRIMARY ACCOUNT INFORMATION

RELATED APPLICATIONS

This application is a continuation of U.S. patent application Ser. No. 15/178,727, entitled "Methods, Procedures and Framework to Provision an eSIM and Make It Multi-SIM Capable Using Primary Account Information," by Vikram B. Yerrabommanahalli, et al., filed Jun. 10, 2016, which claims priority to U.S. provisional patent application Ser. No. 62/204,431, having the same title, by Vikram B. Yerrabommanahalli, et al., filed Aug. 12, 2015, each of which is hereby incorporated by reference in its entirety as though fully and completely set forth herein.

This application is related to co-owned U.S. Pat. No. 8,887,257, filed Apr. 26, 2012, titled "ELECTRONIC ACCESS CLIENT DISTRIBUTION APPARATUS AND METHODS," and co-owned U.S. Pat. No. 8,555,067, filed May 19, 2011, titled "METHODS AND APPARATUS FOR DELIVERING ELECTRONIC IDENTIFICATION COMPONENTS OVER A WIRELESS NETWORK," both of which are incorporated herein in their entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communication, including provisioning a secondary wireless device, such as a smart watch, with an eSIM for wireless communication using account information from a primary wireless device having a subscribed SIM.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices are a newer form of mobile electronic device, one example being smart watches. Certain types of mobile electronic devices may commonly have limited wireless communications capabilities and may be capable of communicating only over wired interfaces or short-range point-to-point technologies. Therefore, such mobile electronic devices may sometimes be associated with a primary wireless communication device, such as a smart phone, and may depend upon the primary device in order to perform long-range wireless communications.

It would be desirable for wearable devices and other limited mobile devices to provide communications capabilities similar to those of smart phones. Thus, improvements in the field are desirable.

SUMMARY

Embodiments are presented herein of, inter alia, a system and associated methods for provisioning a secondary wireless device, such as a smart watch, with an eSIM for wireless communication using account information from a primary wireless device, such as a smart phone, having a subscribed SIM, and activating multi-SIM functionality for the eSIM and the subscribed SIM.

A method is disclosed for initiating multi-SIM functionality between a first mobile device and a second mobile device. The first mobile device may provide, to a cellular communication network, an identifier of a Subscriber Identity Module (SIM) of the first mobile device and an identifier of a SIM of the second mobile device. The first mobile device may request initiation by the cellular communication network of multi-SIM functionality for the SIM of the first mobile device and the SIM of the second mobile device. The first mobile device may receive, from the cellular communication network, an indication that the multi-SIM functionality has been initiated for the SIM of first mobile device and the SIM of the second mobile device.

In some embodiments, the requesting initiation by the cellular communication network of multi-SIM functionality for the SIM of first mobile device and the SIM of the second mobile device may include requesting that the SIM of second mobile device be mapped to a Mobile Directory Number (MDN) to which the SIM of the first mobile device is also mapped.

In some embodiments, the first mobile device may receive an indication of a received telephone communication request, after the receiving the indication that the multi-SIM functionality has been initiated, wherein the second mobile device also receives the indication of the received telephone communication request.

In some embodiments, at least one of the SIM of first mobile device and the SIM of the second mobile device is an embedded SIM (eSIM).

In some embodiments, the identifier of the SIM of the second mobile device may be an embedded Integrated Circuit Card Identifier (eICCID) associated with an embedded SIM (eSIM) of the second mobile device. The first mobile device may request that the cellular communication network bind the eICCID associated with the eSIM of the second mobile device to a Card Serial Number (CSN) of the second mobile device. The first mobile device may receive a confirmation that the eICCID associated with the eSIM of the second mobile device is bound to the CSN of the second mobile device.

A primary mobile device is also disclosed, including a Universal Integrated Circuit Card (UICC) storing a Subscriber Identity Module (SIM) having an identifier identifying the SIM; at least one processor; and a memory storing software instructions executable by the at least one processor to cause the mobile device to perform actions similar to those described in the methods above.

A secondary cellular communication device is also disclosed, including a Universal Integrated Circuit Card (UICC) configured to store an embedded Subscriber Identity Module (eSIM); at least one processor; and a memory storing software instructions executable by the at least one processor. Executing the software instructions may cause the secondary cellular communication device to: receive, from a cellular communication network, a first indication that an eSIM has been bound to the identifier of the secondary cellular communication device; receive, from the cellular communication network, a second indication that multi-SIM functionality has been initiated for the eSIM and a SIM of a primary cellular communication device; download the eSIM to the UICC; and utilize the eSIM to conduct a cellular communication on the cellular communication network.

In some embodiments, the International Mobile Subscriber Identity (IMSI) of the eSIM and an IMSI of the SIM of the primary cellular communication device may be mapped to a single Mobile Directory Number (MDN).

In some embodiments, the first indication and/or the second indication may be received from the cellular communication network via the primary cellular communication device.

In some embodiments, the UICC may be an embedded UICC (eUICC).

In some embodiments, executing the software instructions may further cause the secondary cellular communication device to request provisioning of the eSIM by communicating with an eSIM server via cellular communications using a second eSIM stored on the UICC, the second eSIM having limited cellular communication capabilities.

In some embodiments, executing the software instructions may further cause the secondary cellular communication device to request provisioning of the eSIM by communicating with an eSIM server via a wireless local area network (WLAN).

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
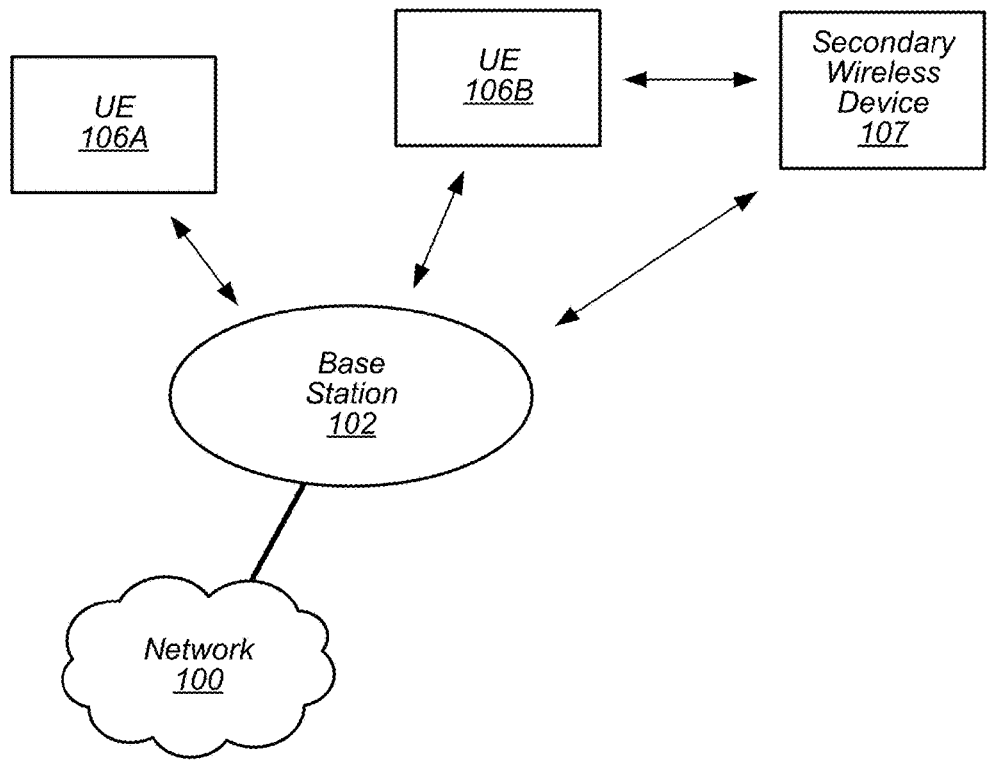
FIG. 1 illustrates an example wireless communication system including a secondary wireless device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

The term "configured to" is used herein to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke interpretation under 35 U.S.C. § 112(f) for that unit/circuit/component.

DETAILED DESCRIPTION

Acronyms

The following acronyms are used in this disclosure.
3GPP: Third Generation Partnership Project
3GPP2: Third Generation Partnership Project 2
CSN: Card Serial Number
eICCID: Embedded Integrated Circuit Card Identifier
eSIM: Embedded SIM
GSM: Global System for Mobile Communications
ICCID: Integrated Circuit Card Identifier
IMSI: International Mobile Subscriber Identity
LTE: Long Term Evolution
LTE-A: LTE-Advanced
SIM: Subscriber Identity Module
UMTS: Universal Mobile Telecommunications System

TERMINOLOGY

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" (also called "eNB") has the full breadth of its ordinary meaning, and at least includes a wireless communication station installed at a fixed location and used to communicate as part of a wireless cellular communication system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Communication System

FIG. 1 illustrates an example of a wireless cellular communication system. It is noted that FIG. 1 represents one possibility among many, and that features of the present disclosure may be implemented in any of various systems, as desired.

As shown, the exemplary wireless communication system includes a cellular base station 102A, which communicates over a transmission medium with one or more wireless devices 106A, 106B, etc., as well as secondary wireless device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a wide geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B are typically handheld devices such as smart phones or tablets, but may be any of various types of device with cellular communications capability. The UE 106B may be configured to communicate with the UE device 107, which may be referred to as a secondary wireless device 107. The secondary wireless device 107 may be any of various types of devices, such as a wearable device, a tablet computing device, a laptop computer, or a handheld device. The secondary wireless device 107 may, in some cases, have a smaller form factor and/or may have limited battery, output power and/or communications abilities relative to UEs 106. As one common example, the UE 106B may be a smart phone carried by a user, and the secondary wireless device 107 may be a smart watch worn by that same user. The UE 106B and the secondary wireless device 107 may communicate, e.g., using any of various short range communication protocols, such as Bluetooth.

In some embodiments the UE 106B and/or the secondary wireless device 107 may be configured to perform dynamic multi-SIM provisioning, as described herein.

Figure 2:
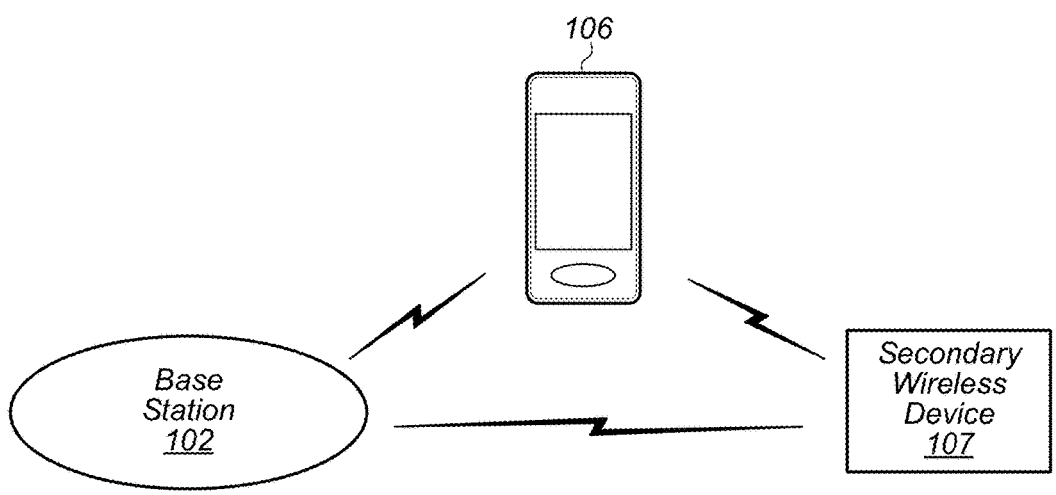
FIG. 2 illustrates an example system where a secondary wireless device can selectively either directly communicate with a cellular base station or utilize the cellular capabilities of an intermediate or proxy device such as a smart phone, according to some embodiments.

FIG. 2 illustrates an example secondary wireless device 107 in communication with base station 102. The secondary wireless device 107 may be a wearable device such as a smart watch. The secondary wireless device 107 may include cellular communication capability and be capable of directly communicating with the base station 102 as shown. The secondary wireless device 107 may also be capable of communicating with another device (e.g., UE 106), e.g., using a short range communications protocol, such as Wi-Fi or Bluetooth.

The secondary wireless device 107 may include a processor that is configured to execute program instructions stored in memory. The secondary wireless device 107 may perform any of the method embodiments described herein by executing such stored instructions. Alternatively, or in addition, the secondary wireless device 107 may include a programmable hardware element such as an FPGA (field-programmable gate array), or other circuitry, that is configured to perform any of the method embodiments described herein, or any portion of any of the method embodiments described herein. For example, the secondary wireless device 107 may be configured to perform dynamic multi-SIM provisioning, as described herein.

The secondary wireless device 107 may include one or more antennas for communicating using two or more wireless communication protocols or radio access technologies. In some embodiments, the secondary wireless device 107 might be configured to communicate using a single shared radio. The shared radio may couple to a single antenna, or may couple to multiple antennas (e.g., for MIMO) for performing wireless communications. Alternatively, the secondary wireless device 107 may include two or more radios. For example, the secondary wireless device 107 might include a shared radio for communicating using either of LTE (or LTE-Advanced) or Bluetooth, and separate radios for communicating using each of LTE-Advanced and Bluetooth. Other configurations are also possible.

The secondary wireless device 107 may be any of various types of devices, and may, in some embodiments, have a smaller form factor relative to a conventional smart phone. As noted above, in some embodiments, the secondary wireless device 107 may be a smart watch or other type of wearable device. As another example, the secondary wireless device 107 may be a tablet device, such as an iPad™, by Apple Inc.

Figure 3:
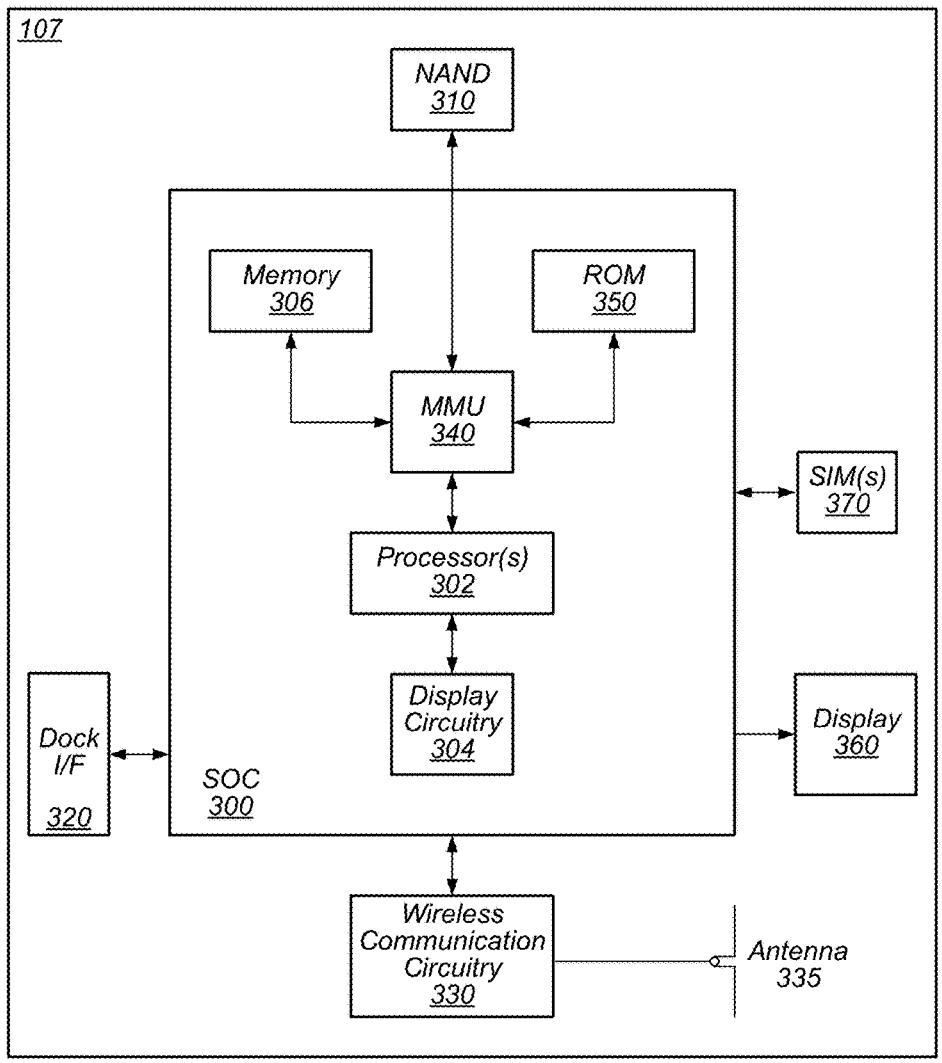
FIG. 3 is a block diagram illustrating an example secondary wireless device, according to some embodiments.

FIG. 3—Example Block Diagram of a Secondary Wireless Device

FIG. 3 illustrates one possible block diagram of a secondary wireless device 107. As shown, the secondary wireless device 107 may include a system on chip (SOC) 300, which may include portions for various purposes. For example, as shown, the SOC 300 may include processor(s) 302 which may execute program instructions for the UE 106, and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, Flash memory 310). The MMU 340 may be configured to perform memory protection and page table translation or set up. In some embodiments, the MMU 340 may be included as a portion of the processor(s) 302.

The secondary wireless device 107 may also include other circuits or devices, such as the display circuitry 304, radio 330, connector I/F 320, and/or display 360. The wireless device 107 may further include one or more smart cards 370 that include SIM (Subscriber Identity Module) functionality, such as one or more UICC(s) (Universal Integrated Circuit Card(s)).

In the embodiment shown, ROM 350 may include a bootloader, which may be executed by the processor(s) 302 during boot up or initialization. As also shown, the SOC 300 may be coupled to various other circuits of the secondary wireless device 107. For example, the secondary wireless device 107 may include various types of memory, a connector interface 320 (e.g., for coupling to a computer system), the display 360, and wireless communication circuitry (e.g., for communication using LTE, CDMA2000, Bluetooth, Wi-Fi, NFC, GPS, etc.).

The secondary wireless device 107 may include at least one antenna, and in some embodiments multiple antennas, for performing wireless communication with base stations and/or other devices. For example, the secondary wireless device 107 may use antenna 335 to perform the wireless communication. As noted above, the UE may in some embodiments be configured to communicate wirelessly using a plurality of wireless communication standards or radio access technologies (RATs).

As noted above, the secondary wireless device 107 may include at least one smart card 370, such as a UICC, which executes one or more Subscriber Identity Module (SIM) applications and/or otherwise implements SIM functionality. The at least one smart card 370 may be only a single smart card 370, or the secondary wireless device 107 may include two or more smart cards 370.

Each smart card 370 may be embedded, e.g., may be soldered onto a circuit board in the secondary wireless device 107, or each smart card 370 may be implemented as a removable smart card. Thus, the smart card(s) 370 may be one or more removable smart cards (such as UICCs, which are sometimes referred to as "SIM cards"), and/or the smart card(s) 370 may be one or more embedded cards (such as embedded UICCs (eUICCs), which are sometimes referred to as "eSIM cards"), which may be fixed/non-removable. In some embodiments, the secondary wireless device 107 may include a combination of removable smart cards and embedded smart cards, as desired. For example, the UE 106 may include two embedded smart cards 370, two removable smart cards 370, or a combination of one embedded smart card 370 and one removable smart card 370. Various other SIM configurations are also contemplated.

In some embodiments, one or more of the smart card(s) 370 may implement embedded SIM (eSIM) functionality. In such embodiments, a single one of the smart card(s) 370 may execute multiple SIMs. An eSIM may be implemented on either an eUICC or a removable UICC, as long as the card's operating system supports eSIM functionality.

Each of the smart card(s) 370 may include components such as a processor and a memory. Instructions for performing SIM/eSIM functionality may be stored in the memory and executed by the processor.

As described herein, the secondary wireless device 107 may include hardware and software components for implementing methods according to embodiments of this disclosure. For example, the secondary wireless device 107 may be configured to perform dynamic multi-SIM provisioning, as described herein. The processor 302 of the secondary wireless device 107 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

It is noted that the UEs 106A and 106B shown in FIG. 1 may have a similar architecture to that described above.

Multi-SIM Provisioning

Some wireless communications networks support multi-SIM functionality. With multi-SIM functionality, multiple SIMs, e.g., associated with multiple devices, may be associated with a shared contact address, such as a shared telephone number. Thus, with multi-SIM functionality, a telephone call placed to the shared telephone number may cause each of the multiple devices to ring simultaneously, or substantially simultaneously. The call may then be accepted on any of the devices. Similarly, a call placed from any of the devices may be identified with the shared number. Other communications functions, such as SMS or MIMS messages, may be handled similarly—i.e., a received message may be delivered to all devices associated with the shared number, and an outgoing message may be identified with the shared number, regardless of which of the associated devices originated the message.

To accomplish multi-SIM functionality between a primary device, such as the UE 106, and a secondary device, such as the secondary wireless device 107, a carrier network may map a SIM of each of the two devices, e.g., the IMSI of each of the devices, to the same Mobile Directory Number (MDN). Thus, each device maintains unique SIM information (e.g., for identification and authentication within the network), while sharing a common MDN. When a communication is received by the network that is addressed to the common MDN, the network may fork the communication, directing it to both the primary device and the secondary device associated with the common MDN. Similarly, when either the primary device or the secondary device initiates a communication, the network may handle the communication as having a point of origin identified by the common MDN. Thus, either device may be used to send or receive communications associated with the MDN, regardless of the proximity or operational state of the other device.

To accomplish multi-SIM functionality within a mobile device, a SIM of the mobile device may include an operating system configured to support multi-SIM. Historically, SIMs have been provisioned with this functionality at time of manufacture. Furthermore, SIMs have historically been manufactured with multi-SIM pairing in place; i.e., with two or more SIMs manufactured as paired or grouped sets of SIMs.

However, the systems and methods disclosed herein provide functionality to dynamically provision a previously unpaired SIM with multi-SIM functionality, as long as the SIM's operating system supports multi-SIM functionality.

Additionally, as discussed herein, eSIMs may also be configured to operate with multi-SIM functionality. Thus, dynamic provisioning of eSIMs, as described herein, allows for already-operating mobile devices to be dynamically provisioned with eSIMs configured to support multi-SIM functionality.

FIGS. 4-8—Dynamically Provisioning an eSIM and Initiating Multi-SIM Functionality FIGS. 4 through 8 are flow diagrams illustrating example methods by which a secondary wireless device 107 may be dynamically provisioned with an eSIM for wireless communication, such as cellular communications, and/or by which multi-SIM functionality may be initiated for a primary wireless device 106 and a secondary wireless device 107. In some scenarios, the eSIM for the secondary device may be provisioned using account information from a primary wireless device 106. For example, a primary wireless device 106 having SIM account information may be configured to sign in to a client portal, and to add the secondary wireless device 107 to the SIM account, e.g., by initiating provisioning of an eSIM associated with the SIM account to the secondary wireless device. If the carrier supports multi-SIM functionality, then the provisioning of the eSIM may include adding multi-SIM functionality to the SIM account.

Figure 4:
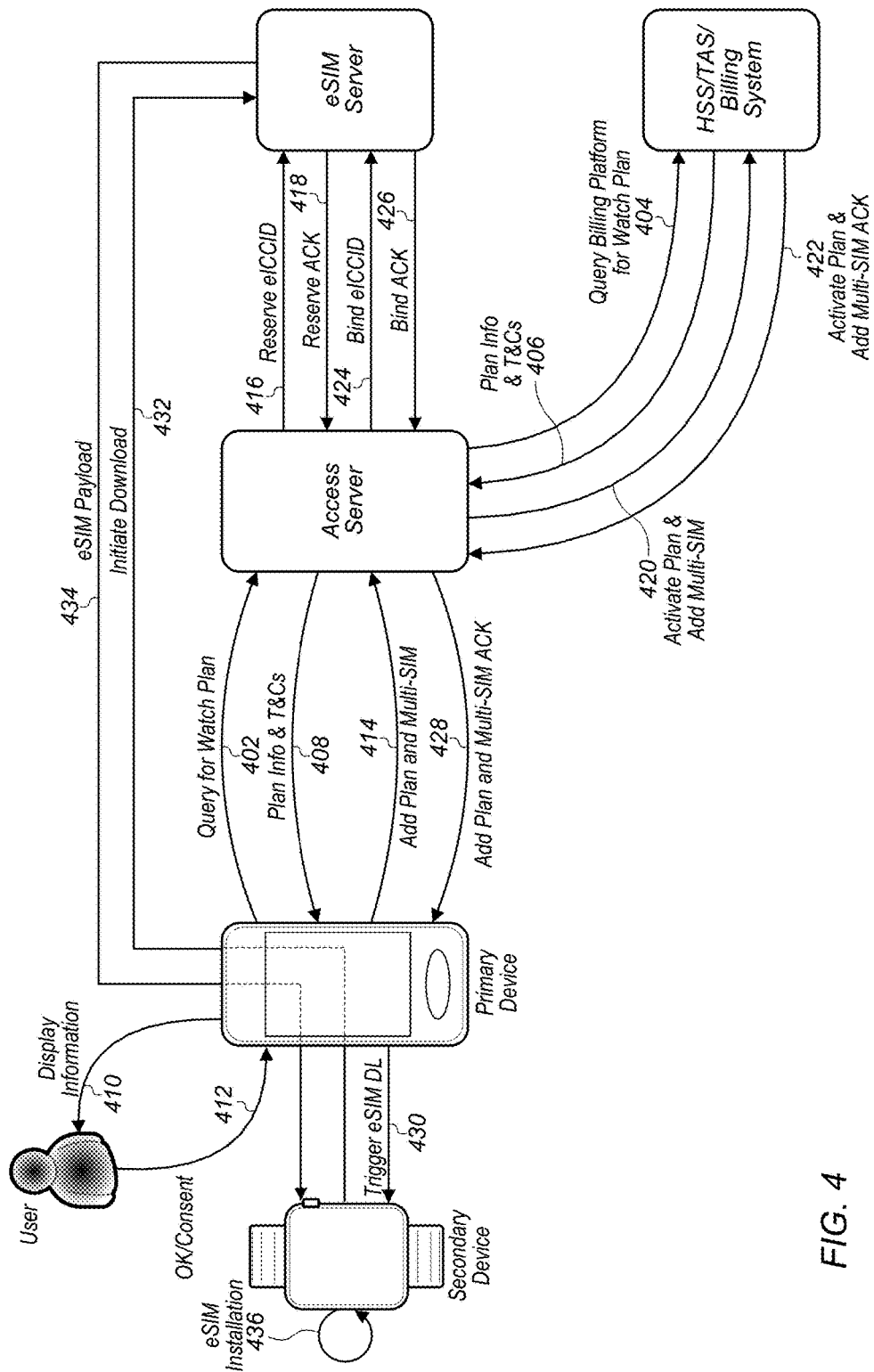
FIG. 4 is a flow diagram illustrating example operation of provisioning an eSIM to a secondary wireless device or initiating multi-SIM functionality using a carrier system, according to some embodiments.
Figure 5:
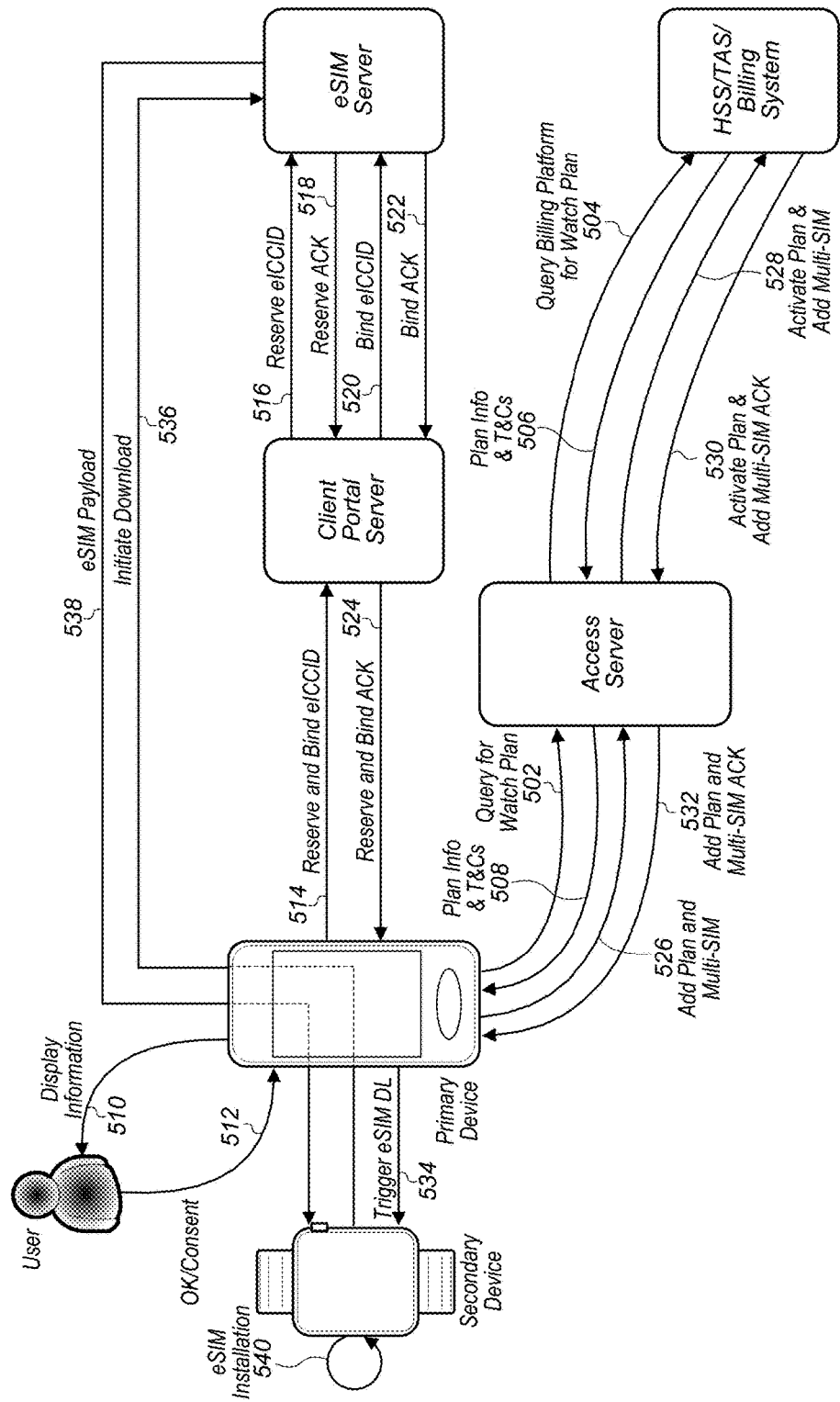
FIG. 5 is a flow diagram illustrating example operation of provisioning an eSIM to a secondary wireless device or initiating multi-SIM functionality using a carrier system supplemented with a client portal server, according to some embodiments.
Figure 6:
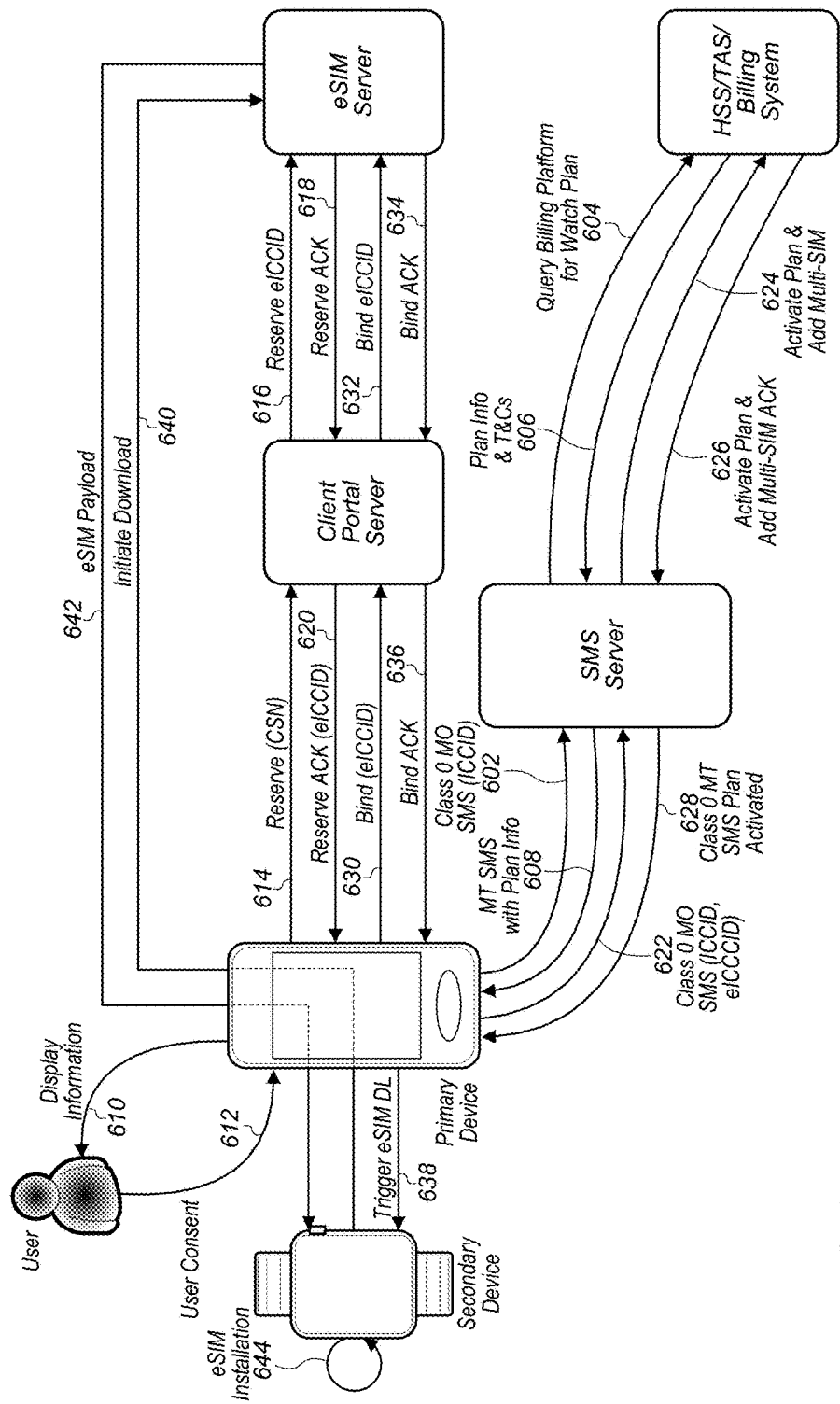
FIG. 6 is a flow diagram illustrating example operation of provisioning an eSIM to a secondary wireless device or initiating multi-SIM functionality using a carrier system including an SMS server and supplemented with a client portal server, according to some embodiments.
Figure 7:
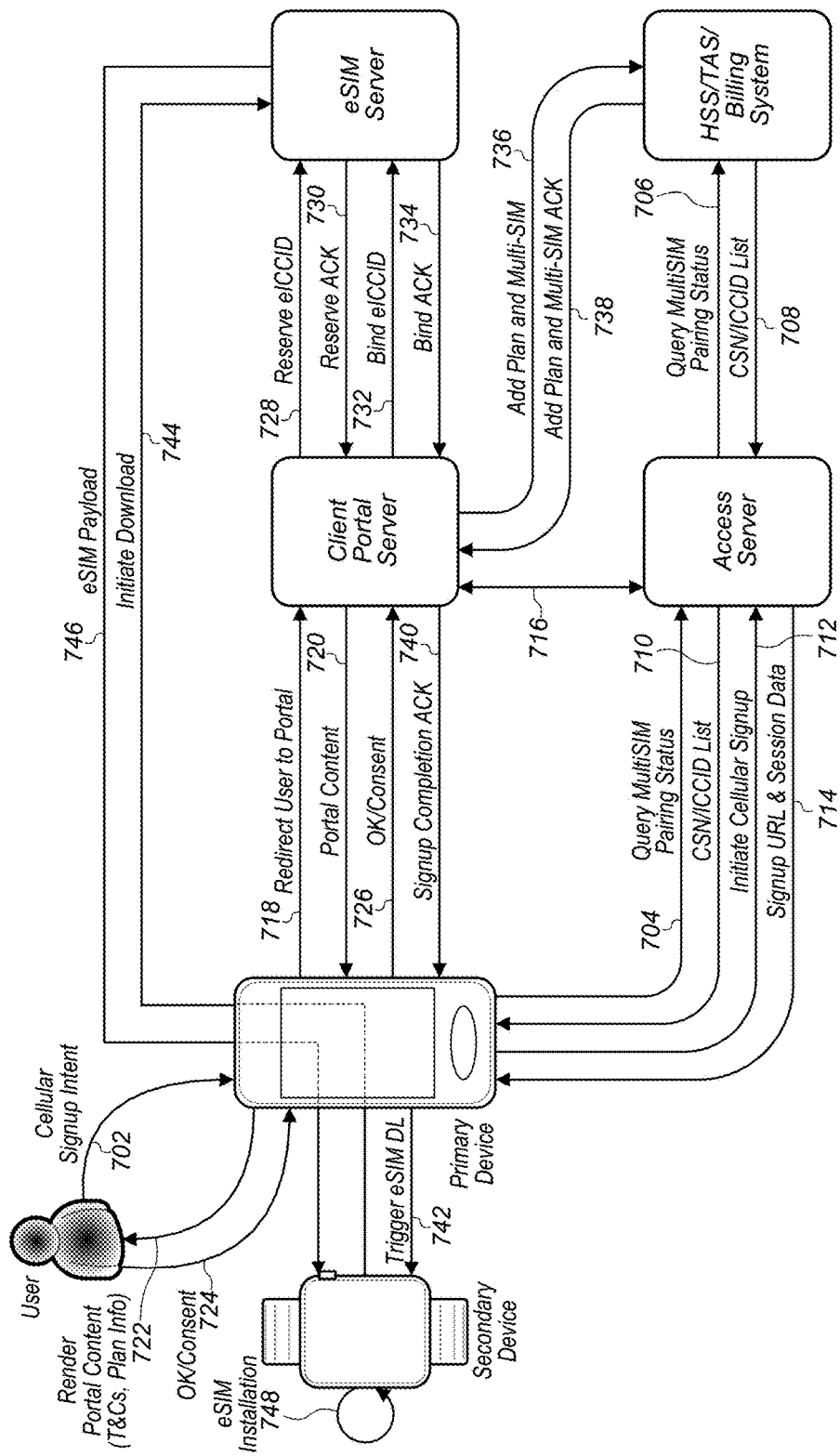
FIG. 7 is a flow diagram illustrating example operation of provisioning an eSIM to a secondary wireless device or initiating multi-SIM functionality using a carrier system supplemented with a client portal server configured to implement a signup procedure, according to some embodiments.
Figure 8:
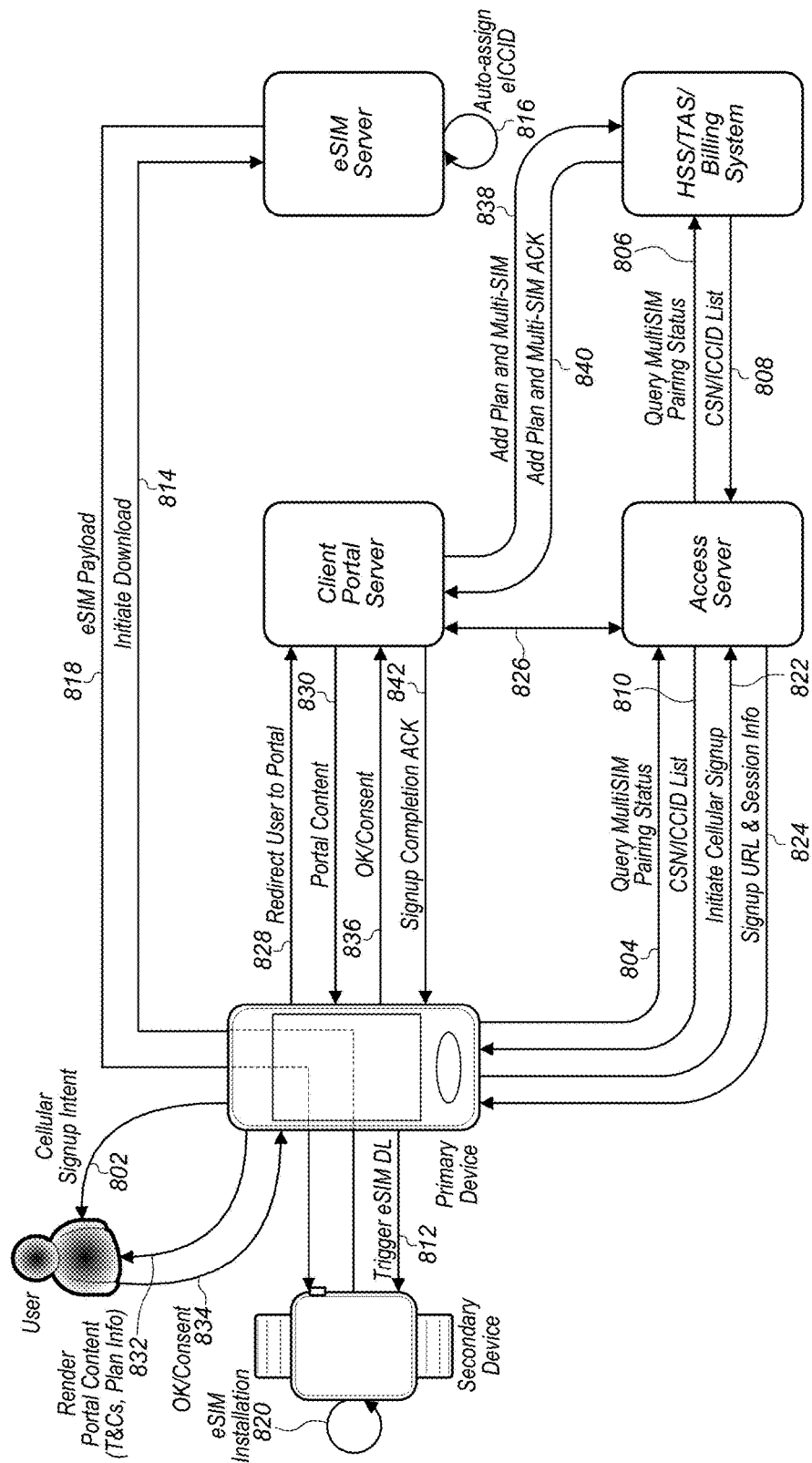
FIG. 8 is a flow diagram illustrating example operation of provisioning an eSIM to a secondary wireless device or initiating multi-SIM functionality using a carrier system with a modified eSIM server, according to some embodiments.

FIG. 4 illustrates provisioning an eSIM to the secondary wireless device 107 and/or initiating multi-SIM functionality using a carrier system. FIG. 5 illustrates provisioning an eSIM to the secondary wireless device 107 and/or initiating multi-SIM functionality using a carrier system supplemented with a client portal server. FIG. 6 illustrates provisioning an eSIM to the secondary wireless device 107 and/or initiating multi-SIM functionality using a carrier system that includes an SMS server and is supplemented with a client portal server. FIG. 7 illustrates provisioning an eSIM to the secondary wireless device and/or initiating multi-SIM functionality using a carrier system supplemented with a client portal server configured to implement a signup procedure. FIG. 8 illustrates provisioning an eSIM to the secondary wireless device and/or initiating multi-SIM functionality using a carrier system with a modified eSIM server.

It should be understood that the flow diagrams illustrated in Figures are simplified for ease of explanation. The systems illustrated may include additional elements and/or signals. Although the following discussion may include descriptions of a first element "transmitting to" a second element one or more signals, it should be understood that such signals may, in some circumstances, be transmitted via intermediary elements, such as a radio access network (e.g. including a cellular base station or other wireless access point), and/or via intermediary networks (e.g., a WLAN, the Internet, and/or other portions of the cellular network).

FIG. 4—Provisioning an eSIM or Initiating Multi-SIM Using a Carrier System

FIG. 4 illustrates communications 402-436, sent in connection with a communications system including a primary device, a secondary device, an access server, a telephony application server (TAS)/billing system, and an eSIM server. Each of the communications 402-436 may include one or more messages transmitted between the illustrated elements of the communications system. The primary device may include a device such as the UE 106, as discussed above. The secondary device may include a device such as the secondary wireless device 107, as discussed above. The access server may include one or more server devices configured to control access to the eSIM server and/or to the HSS/TAS/billing system. The access server may be hosted by the carrier, such as a cellular service provider, or by an agent of the carrier. The HSS/TAS/billing system may include one or more server devices configured to provide wireless account information and services, such as billing information and services, for a wireless device by the carrier. The one or more server devices of the HSS/TAS/billing system may be further configured to provide additional telephony application services, and may act, for example, as a home subscriber server. The HSS/TAS/billing system may be hosted by the carrier or by an agent of the carrier. The eSIM server may include one or more server devices configured to manage and provision eSIMs. The eSIM server may be hosted by the carrier, such as a cellular service provider, or by an agent of the carrier.

The primary device may transmit a query 402, requesting from the access server information regarding service plans available for the secondary device. For example, the query 402 may request information regarding service plans that may be added to an existing service plan of the primary device. The query 402 may identify the primary and/or the secondary device. For example, the query 402 may identify a Card Serial Number (CSN) associated with an eUICC of the secondary device. In some scenarios, using an identifier associated with the physical eUICC, such as a CSN, to identify the secondary device may provide advantages over using other identifiers known in the art, such as an Integrated Circuit Card ID (ICCID) number, which is associated with a SIM. For example, because an eUICC may be dynamically provisioned with an eSIM, an eSIM present on the eUICC may potentially be replaced with a new eSIM, which may have a different ICCID. In other scenarios, an ICCID or other identifier may be used to identify the secondary device. In some scenarios, the query 402 may be transmitted by the secondary device to the access server, e.g., via a WLAN, or by using a second SIM (e.g., a limited functionality SIM), as discussed below.

In response to receiving the query 402, the access server may transmit to the HSS/TAS/billing system a query 404, which may relay to the HSS/TAS/billing system the request for information regarding service plans available for the secondary device.

In response to receiving the query 404, the HSS/TAS/billing system may identify information regarding service plans available for the secondary device. For example, the information may include a list of one or more service plans available to the secondary device, and may include further information, such as a cost of each plan and/or contractual terms and conditions associated with one or more of the plans.

The service plans available to the secondary device may be fixed, or may be dependent upon one or more factors, such as a device type of the secondary device or a service plan associated with the primary device. In some scenarios, the list of service plans may include service plans pertaining solely to the secondary device. For example, the list of service plans may include specified amounts of voice and/or data communications available for use by the secondary device, e.g., within a specified time period, for a given price. As illustrative examples, the list may include service plans such as 400 minutes of voice and 2 GB of data for $X per month, 1000 minutes of voice and 5 GB of data for $Y per month, and/or unlimited voice and data for $Z per month.

Additionally, or alternatively, the list of service plans may include service plans pertaining to both the primary device and the secondary device. For example, the list of service plans may include one or more plans that allow the secondary device to use data and/or voice resources allotted to the primary device for a given price. As an illustrative example, if the primary device operates with a service plan providing 1000 minutes of voice and 5 GB of data each month, the list of service plans may include an option to allow the secondary device to utilize some or all of the 1000 minutes of voice and/or 5 GB of data for an additional $W per month.

The HSS/TAS/billing system may then transmit a response 406, providing to the access server the identified information regarding service plans. Response 406 may be at least partially in response to the query 404.

In response to receiving the response 406, the access server may transmit to the primary device a response 408, which may relay to the primary device some or all of the identified information regarding service plans available for the secondary device.

Upon receiving the information regarding service plans, the primary device may display some or all of the information to a user at 410. For example, the primary device may display a graphical user interface including a list of service plans available for the secondary device. The graphical user interface may further include additional information, such as a cost of each service plan, and/or terms and conditions associated with one or more of the service plans.

At 412, the primary device may receive from the user an input. For example, the primary device may receive input from a user via a touch-screen interaction, voice command, or any other input method. The user input may select one of the available service plans, and may also provide additional input, such as an input signifying acceptance of contractual terms and conditions associated with the selected service plan. In some scenarios, communications 410 and 412 may include multiple steps, and may be iterative. In one illustrative example, the primary device may display a list of available service plans; receive a user selection of one of the displayed service plans; in response, may then display terms and conditions associated with the selected service plan; and may receive an additional user input signifying acceptance of the terms and conditions. Other information may also be displayed, such as requests for payment information, configuration settings, etc., and other user inputs may be received, e.g., in response to such other information. In some scenarios, one or more prompts requesting security information (e.g., username and password, personal information) may also be displayed, and the security information may be received. In some scenarios, the primary device may take no further action toward activating a service plan or initiating multi-SIM functionality unless the correct security information is received.

The primary device may transmit to the access server an Add Plan instruction 414 to activate a service plan for the secondary device. For example, the Add Plan instruction 414 may include instruction to add a service plan for the secondary device to an existing account associated with the primary device. In some examples, the Add Plan instruction 414 may additionally, or alternatively, include an indication to provision the secondary device with multi-SIM functionality based on the primary device. The Add Plan instruction 414 may identify the selected service plan. The Add Plan instruction 414 may also identify the secondary device and/or the primary device, e.g., using one or more ICCIDs and/or CSNs. The Add Plan instruction 414 may be transmitted at least partially in response to receiving the user input at 412. In other scenarios, the primary device may automatically transmit the Add Plan instruction 414 in response to receiving the response 408, without displaying information at 410 or receiving user input at 412, for example if the response 408 identified only one available service plan, or if a service plan may be identified by the primary device based on previously received user preferences or instructions.

In response to receiving the Add Plan instruction 414, the access server may transmit to the eSIM server a Reserve eICCID instruction 416. The Reserve eICCID instruction 416 may identify the secondary device and/or the primary device, e.g., using one or more ICCIDs and/or CSNs. The Reserve eICCID instruction 416 may also identify the selected service plan. The Reserve eICCID instruction 416 may also optionally include an indication that the eICCID to be reserved should be associated with an eSIM configured to support multi-SIM functionality. In response to receiving the Reserve eICCID instruction 416, the eSIM server may reserve an eICCID for the secondary device, wherein the reserved eICCID is associated with an eSIM configured to support the selected service plan. The eSIM server may then transmit to the access server a Reserve ACK 418, acknowledging that an eICCID has been reserved for the secondary device. The Reserve ACK 418 may identify the reserved eICCID.

The access server may transmit to the HSS/TAS/billing system an Activate Plan instruction 420 to activate a service plan for the secondary device. For example, the Activate Plan instruction 420 may include instruction to add a service plan for the secondary device to an existing account associated with the primary device. Additionally, or alternatively, the Activate Plan instruction 420 may include an indication to initiate multi-SIM functionality for the primary device and the secondary device. The Activate Plan instruction 420 may identify the selected service plan. The Activate Plan instruction 420 may also identify the secondary device and/or the primary device, e.g., using one or more ICCIDs (e.g., the reserved eICCID) and/or CSNs. The access server may transmit the Activate Plan instruction 420 at least partially in response to receiving the Reserve ACK 418.

In response to receiving the Activate Plan instruction 420, the HSS/TAS/billing system may activate the selected service plan for the secondary device. For example, the HSS/TAS/billing system may add the selected service plan to an existing account associated with the primary device. Additionally, or alternatively, the HSS/TAS/billing system may initiate multi-SIM functionality for the primary device and the secondary device. For example, the HSS/TAS/billing system may map the IMSI (or other identifier) of each of the primary device and the secondary device to the same MDN. The HSS/TAS/billing system may then transmit to the access server an Activate ACK 422, acknowledging that the selected service plan has been activated and/or that multi-SIM functionality has been initiated. The Activate ACK 422 may include a URL from which the eSIM associated with the bound eICCID may be downloaded.

The access server may transmit to the eSIM server a Bind eICCID instruction 424. The Bind eICCID instruction 424 may identify the secondary device and/or the reserved eICCID. The access server may transmit the Bind eICCID instruction 424 at least partially in response to receiving the Activate ACK 422. In response to receiving the Bind eICCID instruction 424, the eSIM server may bind the reserved eICCID to the secondary device, e.g., by binding the eICCID to the CSN or other identifier of the secondary device. The eSIM may then transmit to the access server a Bind ACK 426, acknowledging that the eICCID has been bound. The Bind ACK 426 may include a URL from which the eSIM associated with the bound eICCID may be downloaded.

The access server may transmit to the primary device an Add Plan ACK 428, acknowledging that the service plan has been activated for the secondary device and/or that multi-SIM functionality has been initiated. The access server may transmit the Add Plan ACK 428 at least partially in response to receiving the Bind ACK 426. The Add Plan ACK 428 may include the eICCID bound to the secondary device by the eSIM server. The Add Plan ACK 428 may also include a URL, or other network address, from which the eSIM associated with the bound eICCID may be downloaded. Alternatively, the URL may be provided at another point, such as in the response 408, or the URL may be pre-defined in a software configuration of the primary device.

The primary device may transmit to the secondary device an eSIM Download instruction 430. The eSIM Download instruction 430 may identify an eSIM to be provisioned to the secondary device, e.g., by identifying the eICCID bound to the secondary device by the eSIM server. Because the secondary device has not yet been provisioned with the bound eSIM for communication on the carrier network, the primary device may, in some scenarios, transmit the eSIM Download instruction 430 via a secondary communication channel, such as a WLAN network or a short-range communication connection, such as a Bluetooth connection. The primary device may transmit the eSIM Download instruction 430 at least partially in response to receiving the Add Plan ACK 428.

The secondary device may transmit to the eSIM server an Initiate Download instruction 432, which may identify one or more of the secondary device, the primary device, or the eSIM to be provisioned to the secondary device. For example, the Initiate Download instruction 432 may include the eICCID bound to the secondary device, the CSN or other identifier of the secondary device, and/or an ICCID or other identifier of the primary device. The secondary device may address the Initiate Download instruction 432 to the URL identified in the Add Plan ACK 428. The secondary device may transmit the Initiate Download instruction 432 at least partially in response to receiving the eSIM Download instruction 430. In some scenarios, the secondary device may transmit the Initiate Download instruction 432 at least partially in response to receiving a Bind ACK, such as the Bind ACK 426, or other indication from the eSIM server, the access server, or the primary device that the eSIM is ready for download. In some scenarios, the secondary device may transmit the Initiate Download instruction 432 at least partially in response to receiving an Activate ACK, such as the Activate ACK 422, or other indication from the HSS/TAS/billing system, the access server, or the primary device that the selected service plan has been activated and/or that the multi-SIM functionality has been initiated.

At least partially in response to receiving the Initiate Download instruction 432, the eSIM server may transmit to the secondary device an eSIM Payload 434, including the eSIM bound to the secondary device.

The secondary device may receive the eSIM Payload 434 and store the included eSIM in an eUICC, at 436. At this stage, the secondary device has been successfully provisioned with the eSIM, and may use the provisioned eSIM for communication on the carrier network. The secondary device may, in some scenarios, communicate to the first device a notification of success or failure of downloading the eSIM.

As illustrated in FIG. 4, in some scenarios, the primary device may act as a proxy for the secondary device in communicating the Initiate Download instruction 432 and/or the eSIM Payload 434 with the eSIM server, e.g., because the secondary device has not yet been provisioned with the bound eSIM for communication on the carrier network. For example, the secondary device may not be configured to communicate via cellular or WLAN networks, or may fail to obtain an adequate connection via such networks. In such scenarios, the primary device may act as a proxy in communicating with the eSIM server. For example, the secondary device may transmit the Initiate Download instruction 432 to the primary device via a secondary communication channel, such as a short-range communication connection, such as a Bluetooth connection. The primary device may then forward the Initiate Download instruction 432 to the eSIM server via the carrier network. Similarly, the eSIM server may transmit the eSIM Payload 434 to the primary device. The primary device may then forward the eSIM Payload 434 to the secondary device via the secondary communication channel.

In other scenarios, the secondary device may be capable of communicating with the eSIM server and/or other network components directly, without the primary device acting as a proxy. For example, in some such scenarios, the secondary device may be incapable of communicating via the carrier network, but may be capable of communicating with the eSIM server via a long-range secondary communication network, such as a WLAN network. In other such scenarios, the secondary device may have limited capability to communicate via the carrier network, even prior to being provisioned with the bound eSIM. For example, the secondary device may have previously been provisioned with a SIM configured to support only cellular data communications, and not cellular voice communications. In such an example, the bound eSIM may be downloaded by the secondary device (e.g., where the secondary device includes multiple UICCs/eUICCs, and/or a single eUICC configured to execute multiple SIMs) to provide additional communications capabilities via the carrier network, such as voice communications. Thus, the secondary device may be capable of communicating with the eSIM server via the carrier network using the previously provisioned data-only SIM in order to obtain the new bound eSIM. As another example, the secondary device may have previously been provisioned with a limited SIM—sometimes referred to as a "bootstrap SIM." A bootstrap SIM may be configured to support only communications in connection with provisioning of a new eSIM, such as transmitting the Initiate Download instruction 432 and receiving the eSIM Payload 434, and may not support communication of user data. Thus, the secondary device may be capable of communicating with the eSIM server via the carrier network using the previously provisioned bootstrap SIM in order to obtain the new bound eSIM.

The methods as disclosed above in connection with FIG. 4 are useful in various scenarios, and especially in scenarios in which the capabilities of the secondary device are limited with regard to communication or configuration. For example, in scenarios in which the secondary device is a smart watch, the method illustrated in FIG. 4 may be advantageous, as a larger or more capable interface of the primary device may be leveraged in the process of provisioning the secondary device with an eSIM. Additionally, as discussed above, communications capabilities of the primary device may also be leveraged in communicating with the eSIM server and/or the access server in the process of provisioning the secondary device with an eSIM. Additionally, as discussed above, involvement of the primary device in the provisioning process may be desirable in scenarios in which the service plan selected for the secondary device is to be added to an existing account associated with the primary device.

However, in other scenarios, the secondary device may include communication and configuration capabilities sufficient to allow the secondary device to initiate its own provisioning with an eSIM. For example, the secondary device may be a tablet computer, which may include a large display, and which may further include long-range communication capabilities, e.g., by using WLAN communication circuitry and/or a previously provisioned SIM, such as a data-only SIM or a bootstrap SIM. In such scenarios, the method of FIG. 4 may be adapted to remove the primary device. For example, the secondary device may transmit the query 402, the Add Plan instruction 414, and the Initiate Download instruction 432. Similarly, the secondary device may receive the reply 408, the Add Plan ACK 428, and the eSIM Payload 434. The secondary device may also display information at 410 and receive user input at 412. The eSIM Download instruction 430 may be omitted.

It should be understood that FIG. 4, and the preceding description thereof, are merely exemplary, and various steps or communications may be omitted or reordered. For example, in some scenarios, the access server may transmit the Bind eICCID instruction 424 in response to receiving the Reserve ACK 418, and may then transmit the Activate Plan instruction 420 in response to receiving the Bind ACK 426. As another example, in some scenarios, some or all of communications 402-410 may be omitted, for example, where only one service plan is available for the secondary device. In some such scenarios, a user instruction received at 412 may initiate transmission of the Add Plan instruction 414 with regard to the one available service plan, without transmission of communications 402-410.

As yet another example, multi-SIM functionality may be initiated for the primary device and the secondary device, where the secondary device has already been provisioned with a multi-SIM-capable SIM. In some such scenarios, communications 402-410, 416, 418, 424, 426, and 430-434 may be omitted. For example, a user input at 412 may cause the primary device to transmit the Add Plan instruction 414, leading to the Activate Plan instruction 420. As noted above, the Add Plan instruction 414 and the Activate Plan instruction 420 may include an indication to initiate multi-SIM functionality. In this example, the Add Plan instruction 414 and the Activate Plan instruction 420 may not include any instruction to add a new service plan. In response to receiving the Activate Plan instruction 420, the HSS/TAS/billing system may initiate multi-sim functionality, e.g., by mapping an IMSI (or other identifier) of each of the primary device and the secondary device to the same MDN.

It should be understood that, while FIG. 4 illustrates the primary device as a smart phone and the secondary device as a smart watch, these illustrations are not intended to be limiting. The primary device and the secondary device are intended to have their full breadth of scope as defined herein.

FIG. 5—Provisioning an eSIM or Initiating Multi-SIM Using a Client Portal Server FIG. 5 illustrates communications 502-540, sent in connection with a communications system including a primary device, a secondary device, an access server, a telephony application server (TAS)/billing system, a client portal server, and an eSIM server. Each of the communications 502-540 may include one or more messages transmitted between the illustrated elements of the communications system. The primary device may include a device such as the UE 106, as discussed above. The secondary device may include a device such as the secondary wireless device 107, as discussed above. The access server may include one or more server devices configured to control access to the HSS/TAS/billing system. The access server may be hosted by the carrier, such as a cellular service provider, or by an agent of the carrier. The HSS/TAS/billing system may include one or more server devices configured to provide wireless account information and services, such as billing information and services, for a wireless device by the carrier. The one or more server devices of the HSS/TAS/billing system may be further configured to provide additional telephony application services, and may act, for example, as a home subscriber server. The HSS/TAS/billing system may be hosted by the carrier or by an agent of the carrier. The eSIM server may include one or more server devices configured to manage and provision eSIMs. The eSIM server may be hosted by the carrier, such as a cellular service provider, or by an agent of the carrier, or by a third-party entity, such as, e.g., an entity that may be capable of verifying an association between the primary device and the secondary device. The client portal server may include one or more server devices configured to facilitate interaction between a wireless device and the carrier. For example, the client portal server may be configured to provide a security interface between the primary device and the eSIM server. Specifically, in some scenarios, the eSIM server may be configured to communicate only with a trusted network entity, such as a client portal server and/or an access server. The client portal server may be hosted by a carrier or agent of the carrier, or by the third-party entity.

By providing and hosting the client portal server and the eSIM server, the third-party entity may provide for provision of eSIMs operable on the carrier network, while decreasing the changes to be made by the carrier to the previously existing carrier network.

Communications 502-512 may be similar to communications 402-412 of FIG. 4, and the description of each of communications 402-412 may be applied, mutatis mutandis, to communications 502-512.

The primary device may transmit to the client portal server a Reserve and Bind eICCID instruction 514. The Reserve and Bind eICCID instruction 514 may identify the selected service plan. The Reserve and Bind eICCID instruction 514 may also optionally include an indication that the eICCID to be reserved should be associated with an eSIM configured to support multi-SIM functionality. The Reserve and Bind eICCID instruction 514 may also identify the secondary device and/or the primary device, e.g., using one or more ICCIDs and/or CSNs. The Reserve and Bind eICCID instruction 514 may be transmitted at least partially in response to receiving the user input at 512.

In response to receiving the Reserve and Bind eICCID instruction 514, the client portal server may transmit to the eSIM server a Reserve eICCID instruction 516. The Reserve eICCID instruction 516 may identify the secondary device and/or the primary device, e.g., using one or more ICCIDs and/or CSNs. The Reserve eICCID instruction 516 may also identify the selected service plan. The Reserve eICCID instruction 516 may also optionally include an indication that the eICCID to be reserved should be associated with an eSIM configured to support multi-SIM functionality. In response to receiving the Reserve eICCID instruction 516, the eSIM server may reserve an eICCID for the secondary device, wherein the reserved eICCID is associated with an eSIM configured to support the selected service plan. The eSIM server may then transmit to the client portal server a Reserve ACK 518, acknowledging that an eICCID has been reserved for the secondary device. The Reserve ACK 518 may identify the reserved eICCID.

The client portal server may transmit to the eSIM server a Bind eICCID instruction 520. The Bind eICCID instruction 520 may identify the secondary device and/or the reserved eICCID. The client portal server may transmit the Bind eICCID instruction 520 at least partially in response to receiving the Reserve ACK 518. In response to receiving the Bind eICCID instruction 520, the eSIM server may bind the reserved eICCID to the secondary device, e.g., by binding the eICCID to the CSN or other identifier of the secondary device. The eSIM may then transmit to the client portal server a Bind ACK 522, acknowledging that the eICCID has been bound. The Bind ACK 522 may identify the bound eICCID. The Bind ACK 522 may include a URL from which the eSIM associated with the bound eICCID may be downloaded.

The client portal server may transmit to the primary device a Reserve and Bind ACK 524, acknowledging that the eICCID has been bound. The Reserve and Bind ACK 524 may identify the bound eICCID. The client portal may transmit the Reserve and Bind ACK 524 at least partially in response to receiving the Bind ACK 522. The Reserve and Bind ACK 524 may include a URL from which the eSIM associated with the bound eICCID may be downloaded.

The primary device may transmit to the access server an Add Plan instruction 526 to activate a service plan for the secondary device. For example, the Add Plan instruction 526 may include instruction to add a service plan for the secondary device to an existing account associated with the primary device. The Add Plan instruction 526 may identify the service plan selected, e.g., at step 512. Additionally, or alternatively, the Add Plan instruction 526 may include an indication to initiate multi-SIM functionality for the primary device and the secondary device. The Add Plan instruction 526 may also identify the secondary device and/or the primary device, e.g., using one or more ICCIDs and/or CSNs, and may also identify the bound eICCID. The Add Plan instruction 526 may be transmitted at least partially in response to receiving the Reserve and Bind ACK 524.

The access server may transmit to the HSS/TAS/billing system an Activate Plan instruction 528 to activate a service plan for the secondary device. For example, the Activate Plan instruction 528 may include instruction to add a service plan for the secondary device to an existing account associated with the primary device. The Activate Plan instruction 528 may identify the selected service plan. Additionally, or alternatively, the Activate Plan instruction 528 may include an indication to initiate multi-SIM functionality for the primary device and the secondary device. The Activate Plan instruction 528 may also identify the secondary device and/or the primary device, e.g., using one or more ICCIDs and/or CSNs, and may also identify the bound eICCID. The access server may transmit the Activate Plan instruction 528 at least partially in response to receiving the Add Plan instruction 526.

In response to receiving the Activate Plan instruction 528, the HSS/TAS/billing system may activate the selected service plan for the secondary device. For example, the HSS/TAS/billing system may add the selected service plan to an existing account associated with the primary device. Additionally, or alternatively, the HSS/TAS/billing system may initiate multi-SIM functionality for the primary device and the secondary device. For example, the HSS/TAS/billing system may map the IMSI (or other identifier) of each of the primary device and the secondary device to the same MDN. The HSS/TAS/billing system may then transmit to the access server an Activate ACK 530, acknowledging that the selected service plan has been activated and/or that multi-SIM functionality has been initiated. The Activate ACK 530 may include a URL from which the eSIM associated with the bound eICCID may be downloaded.

The access server may transmit to the primary device an Add Plan ACK 532, acknowledging that the service plan has been activated for the secondary device and/or that multi-SIM functionality has been initiated. The access server may transmit the Add Plan ACK 532 at least partially in response to receiving the Activate ACK 530. The Add Plan ACK 532 may identify the secondary device and/or the primary device, e.g., using one or more ICCIDs (e.g., the reserved eICCID) and/or CSNs. The Add Plan ACK 532 may also include a URL from which the eSIM associated with the bound eICCID may be downloaded. Alternatively, the URL may be provided at another point, such as in the response 508, or the URL may be pre-defined in a software configuration of the primary device.

Communications 534, 536, 538, and 540 may be similar to communications 430, 432, 434, and 436, respectively, of FIG. 4, and the description of each of communications 430, 432, 434, and 436 may be applied, mutatis mutandis, to communications 534, 536, 538, and 540.

As with FIG. 4, the method of FIG. 5 may be adapted to allow the secondary device to initiate its own provisioning with an eSIM.

It should be understood that FIG. 5, and the preceding description thereof, are merely exemplary, and various steps or communications may be omitted or reordered. For example, in some scenarios, some or all of communications 502-510 may be omitted, for example, where only one service plan is available for the secondary device. In some such scenarios, a user instruction received at 512 may initiate transmission of the Reserve and Bind eICCID instruction 514 with regard to the one available service plan, without transmission of communications 502-510.

As another example, multi-SIM functionality may be initiated for the primary device and the secondary device, where the secondary device has already been provisioned with a multi-SIM-capable SIM. In some such scenarios, communications 502-510, 514-524, and 534-540 may be omitted. For example, a user input at 512 may cause the primary device to transmit the Add Plan instruction 526, leading to the Activate Plan instruction 528. As noted above, the Add Plan instruction 526 and the Activate Plan instruction 528 may include an indication to initiate multi-SIM functionality. In this example, the Add Plan instruction 526 and the Activate Plan instruction 528 may not include any instruction to add a new service plan. In response to receiving the Activate Plan instruction 528, the HS S/TAS/billing system may initiate multi-sim functionality, e.g., by mapping an IMSI (or other identifier) of each of the primary device and the secondary device to the same MDN.

It should be understood that, while FIG. 5 illustrates the primary device as a smart phone and the secondary device as a smart watch, these illustrations are not intended to be limiting. The primary device and the secondary device are intended to have their full breadth of scope as defined herein.

FIG. 6—Provisioning an eSIM or Initiating Multi-SIM Using an SMS Server

FIG. 6 illustrates communications 602-644, sent in connection with a communications system including a primary device, a secondary device, an SMS server, a telephony application server (TAS)/billing system, a client portal server, and an eSIM server. Each of the communications 602-644 may include one or more messages transmitted between the illustrated elements of the communications system. The primary device, the secondary device, the HSS/TAS/billing system, the client portal server, and the eSIM server may be as described with regard to FIG. 5. The SMS server may include one or more server devices configured to control access to the HSS/TAS/billing system. Specifically, the SMS server may include an internet protocol (IP) short message gateway (IP-SM-GW), and may be configured to receive and process SMS messages. The SMS server may be hosted by the carrier, such as a cellular service provider, or by an agent of the carrier.

By providing and hosting the client portal server and the eSIM server, the third-party entity may provide for provision of eSIMs operable on the carrier network, while decreasing the changes to be made by the carrier to the previously existing carrier network. Utilizing an SMS server, such as an IP-SM-GW, rather than a more specialized access server, may further reduce the changes to be made, and the resulting overhead incurred, by the carrier.

Communications 602-612 may be similar to communications 402-412 of FIG. 4, and the description of each of communications 402-412 may be applied, mutatis mutandis, to communications 602-612.

The primary device may transmit to the client portal server a Reserve instruction 614. The Reserve instruction 614 may identify the selected service plan. The Reserve instruction 614 may also identify the secondary device and/or the primary device, e.g., using one or more ICCIDs and/or CSNs. The Reserve instruction 614 may be transmitted at least partially in response to receiving the user input at 612.

In response to receiving the Reserve instruction 614, the client portal server may transmit to the eSIM server a Reserve eICCID instruction 616. The Reserve eICCID instruction 616 may identify the secondary device and/or the primary device, e.g., using one or more ICCIDs and/or CSNs. The Reserve eICCID instruction 616 may also identify the selected service plan. The Reserve eICCID instruction 614 may also optionally include an indication that the eICCID to be reserved should be associated with an eSIM configured to support multi-SIM functionality. In response to receiving the Reserve eICCID instruction 616, the eSIM server may reserve an eICCID for the secondary device, wherein the reserved eICCID is associated with an eSIM configured to support the selected service plan. The eSIM server may then transmit to the client portal server a Reserve ACK 618, acknowledging that an eICCID has been reserved for the secondary device. The Reserve ACK 618 may identify the reserved eICCID.

The client portal server may transmit to the primary device a Reserve ACK 620, acknowledging that the eICCID has been bound. The Reserve ACK 620 may identify the bound eICCID. The client portal may transmit the Reserve ACK 620 at least partially in response to receiving the Reserve ACK 618.

The primary device may transmit to the SMS server an Add Plan SMS 622, including an indication to activate a service plan for the secondary device. For example, the Add Plan SMS 622 may include an indication to add a service plan for the secondary device to an existing account associated with the primary device. The Add Plan SMS 622 may identify the selected service plan. Additionally, or alternatively, the Add Plan SMS 622 may include an indication to initiate multi-SIM functionality for the primary device and the secondary device. The Add Plan SMS 622 may also identify the secondary device and/or the primary device, e.g., using one or more ICCIDs and/or CSNs, and may further include the reserved eICCID. The Add Plan SMS 622 may be a mobile originated (MO) background (e.g., Class 0) SMS. The Add Plan SMS 622 may be transmitted at least partially in response to receiving the Reserve ACK 620.

The SMS server may transmit to the HSS/TAS/billing system an Activate Plan instruction 624 to activate a service plan for the secondary device. For example, the Activate Plan instruction 624 may include instruction to add a service plan for the secondary device to an existing account associated with the primary device. The Activate Plan instruction 624 may identify the selected service plan. Additionally, or alternatively, the Activate Plan instruction 528 may include an indication to initiate multi-SIM functionality for the primary device and the secondary device. The Activate Plan instruction 624 may also identify the secondary device and/or the primary device, e.g., using one or more ICCIDs and/or CSNs, and may also identify the bound eICCID. The SMS server may transmit the Activate Plan instruction 624 at least partially in response to receiving the Add Plan SMS 622.

In response to receiving the Activate Plan instruction 624, the HSS/TAS/billing system may activate the selected service plan for the secondary device. For example, the HSS/TAS/billing system may add the selected service plan to an existing account associated with the primary device. Additionally, or alternatively, the HSS/TAS/billing system may initiate multi-SIM functionality for the primary device and the secondary device. For example, the HSS/TAS/billing system may map the IMSI (or other identifier) of each of the primary device and the secondary device to the same MDN. The HSS/TAS/billing system may then transmit to the access server an Activate ACK 626, acknowledging that the selected service plan has been activated and/or that multi-SIM functionality has been initiated. The Activate ACK 626 may include a URL from which the eSIM associated with the bound eICCID may be downloaded.

The SMS server may transmit to the primary device a Plan Activated SMS 628, acknowledging that the service plan has been activated for the secondary device and/or that multi-SIM functionality has been initiated. The SMS server may transmit the Plan Activated SMS 628 at least partially in response to receiving the Activate ACK 626. The Plan Activated SMS 628 may identify the secondary device and/or the primary device, e.g., using one or more ICCIDs (e.g., the reserved eICCID) and/or CSNs. The Plan Activated SMS 628 may also include a URL from which the eSIM associated with the bound eICCID may be downloaded. Alternatively, the URL may be provided at another point, such as in the response 608, or the URL may be pre-defined in the primary device's software configuration. The Plan Activated SMS 628 may be a mobile terminated (MT) background (e.g., Class 0) SMS.

The primary device may transmit to the client portal server a Bind instruction 630. The Bind instruction 630 may identify the primary device, the secondary device and/or the reserved eICCID. The primary device may transmit the Bind instruction 630 at least partially in response to receiving the Plan Activated SMS 628.

The client portal server may transmit to the eSIM server a Bind eICCID instruction 632. The Bind eICCID instruction 632 may identify the secondary device and/or the reserved eICCID. The client portal server may transmit the Bind eICCID instruction 632 at least partially in response to receiving the Bind instruction 630. In response to receiving the Bind eICCID instruction 632, the eSIM server may bind the reserved eICCID to the secondary device, e.g., by binding the eICCID to the CSN or other identifier of the secondary device. The eSIM may then transmit to the client portal server a Bind ACK 634, acknowledging that the eICCID has been bound. The Bind ACK 634 may identify the bound eICCID. The Bind ACK 634 may also include a URL from which the eSIM associated with the bound eICCID may be downloaded.

The client portal server may transmit to the primary device a Bind ACK 636, acknowledging that the eICCID has been bound. The Bind ACK 636 may identify the bound eICCID. The Bind ACK 636 may also include a URL from which the eSIM associated with the bound eICCID may be downloaded. The client portal may transmit the Bind ACK 636 at least partially in response to receiving the Bind ACK 634.

Communications 638, 640, 642, and 644 may be similar to communications 430, 432, 434, and 436, respectively, of FIG. 4, and the description of each of communications 430, 432, 434, and 436 may be applied, mutatis mutandis, to communications 638, 640, 642, and 644.

It may be noted that FIG. 5 and FIG. 6 illustrate similar network structure, but differing service flows. Specifically, FIG. 5 illustrates an embodiment in which the eICCID is both reserved and bound prior to an Activate Plan instruction being sent through the carrier to the HSS/TAS/billing system. By contrast, FIG. 6 illustrates an embodiment in which an Activate Plan instruction is sent through the carrier to the HSS/TAS/billing system between the eICCID being reserved and the eICCID being bound. It should be appreciated that either of these two service flows may be applied in conjunction with an access server (as in FIG. 5) or an SMS server (as in FIG. 6).

As with FIG. 4, the method of FIG. 6 may be adapted to allow the secondary device to initiate its own provisioning with an eSIM.

It should be understood that FIG. 6, and the preceding description thereof, are merely exemplary, and various steps or communications may be omitted or reordered. For example, in some scenarios, some or all of communications 602-610 may be omitted, for example, where only one service plan is available for the secondary device. In some such scenarios, a user instruction received at 612 may initiate transmission of the Reserve instruction 614 with regard to the one available service plan, without transmission of communications 602-610.

As another example, multi-SIM functionality may be initiated for the primary device and the secondary device, where the secondary device has already been provisioned with a multi-SIM-capable SIM. In some such scenarios, communications 502-510, 614-620, 630-636, and 638-644 may be omitted. For example, a user input at 612 may cause the primary device to transmit the Add Plan SMS 622, leading to the Activate Plan instruction 624. As noted above, the Add Plan SMS 622 and the Activate Plan instruction 624 may include an indication to initiate multi-SIM functionality. In this example, the Add Plan SMS 622 and the Activate Plan instruction 624 may not include any instruction to add a new service plan. In response to receiving the Activate Plan instruction 624, the HSS/TAS/billing system may initiate multi-sim functionality, e.g., by mapping an IMSI (or other identifier) of each of the primary device and the secondary device to the same MDN.

It should be understood that, while FIG. 6 illustrates the primary device as a smart phone and the secondary device as a smart watch, these illustrations are not intended to be limiting. The primary device and the secondary device are intended to have their full breadth of scope as defined herein.

FIG. 7—Provisioning an eSIM or Initiating Multi-SIM Using an Enhanced Client Portal Server FIG. 7 illustrates communications 702-748, sent in connection with a communications system including a primary device, a secondary device, an access server, a telephony application server (TAS)/billing system, a client portal server, and an eSIM server. Each of the communications 702-748 may include one or more messages transmitted between the illustrated elements of the communications system. Each of the illustrated elements may be defined, and may operate, substantially as discussed with regard to FIG. 5. However, in the example of FIG. 7, the client portal server may be further configured to perform additional functions in activating a service plan for the secondary device and initiating multi-SIM functionality. By configuring the client portal server to perform these additional functions, the example of FIG. 7 may reduce the processing and communication burden on the primary device, relative to the example of FIG. 5.

At 702, the primary device may receive an input from the user, indicating a request to initiate cellular functionality for the secondary device. For example, the input of 702 may request activating a cellular service plan for the secondary device, provisioning of an eSIM to the secondary device, and/or initiating multi-SIM functionality between the primary device and the secondary device. The input of 702 may also indicate a carrier network for which the eSIM should be operable. It should be understood that communication 702, or an equivalent communication, may be included at the start of any of the preceding examples of FIGS. 4-6, although not shown in those figures.

The primary device may, e.g., in response to the user input of 702, transmit to the access server a query 704 for information regarding which, if any, secondary devices are currently (or in some scenarios have previously been) configured for multi-SIM functionality with the primary device (or a particular SIM of the primary device) and/or are currently sharing a service plan with the primary device (or a particular SIM of the primary device). The query 704 may include an identifier of the primary device and/or of a SIM of the primary device, such as an ICCID or IMSI.

In response to receiving the query 704, the access server may transmit to the HSS/TAS/billing system a query 706, which may relay to the HSS/TAS/billing system the request for information regarding secondary devices associated with the primary device according to the query 704.

In response to receiving the query 706, the HSS/TAS/billing system may identify the requested information, and provide to the access server a response 708. For example, the response 708 may include a list of zero or more secondary devices that are currently configured for multi-SIM functionality with the primary device and/or are currently sharing a service plan with the primary device. In some scenarios, the response 708 may identify a secondary device included in the list by a CSN of the second device, and/or by an ICCID of a SIM (e.g., an eICCID of an eSIM) associated with the CSN. In some scenarios, the list of zero or more secondary devices may include only secondary devices that are currently configured for multi-SIM functionality with the primary device and/or are currently sharing a service plan with the primary device on the carrier network specified in communication 702.

In response to receiving the response 708, the access server may transmit to the primary device a response 710, which may relay to the primary device the information regarding the secondary devices associated with the primary device according to the query 704, e.g, including the list of zero or more secondary devices.

In response to receiving the response 710, the primary device may determine whether the response 710 indicates that the secondary device is already configured for multi-SIM functionality with the primary device and/or currently sharing a service plan with the primary device. For example, the primary device may determine whether a CSN and/or associated ICCID, or other identifier, of the secondary device is included in the list of zero or more secondary devices.

If the primary device determines that the response 710 indicates that the secondary device is already configured for multi-SIM functionality with the primary device and/or currently sharing a service plan with the primary device, then the primary device may terminate the procedure, and may, in some scenarios, inform the user.

If the primary device instead determines that the response 710 indicates that the secondary device is not already configured for multi-SIM functionality with the primary device and/or currently sharing a service plan with the primary device, then the primary device may transmit to the access server an initiation request 712 to initiate cellular signup for the secondary device.

It should be understood that communications 704-710, or equivalent communications, may be included at the start of any of the preceding examples of FIGS. 4-6, although not shown in those figures. Specifically, step 402, 502, or 602 may, in some scenarios, be performed response to the primary device determining that the response 710 indicates that the secondary device is not already configured for multi-SIM functionality with the primary device and/or currently sharing a service plan with the primary device, following the communications 702-710.

The initiation request 712 may include a request to activate a cellular service plan for the secondary device and/or a request to initiate a procedure for provisioning an eSIM to the secondary device and/or a procedure for initiating multi-SIM functionality between the primary device and the secondary device.

In response to receiving the initiation request 712, the access server may transmit to the primary device a signup information message 714. The signup information message 714 may include information for proceeding with the requested cellular signup procedure. For example, the signup information message 714 may include a URL or other address of the client portal server. The signup information message 714 may further include session data regarding the existing communication session between the primary device and the cellular network, e.g., via the access server.

Further in response to receiving the initiation request 712, the access server may, at 716, provide to the client portal server session data regarding the existing communication session between the primary device and the cellular network. The session data communicated to the client portal server at 716 may be the same as that included in the signup information message 714, or may include different/additional session information. In some scenarios, a shared memory (not shown) may be accessible to both the access server and the client portal server. In such scenarios, communication 716 may include the access server storing the session data to the shared memory, and the client portal server retrieving the session data from the shared memory. In some scenarios, the client portal server may retrieve the session data from the shared memory at some later time, such as in response to a communication from the primary device, e.g., in which the primary device requests to continue the communication session with the client portal server. The communication 716 may include additional passing of session data or other information between the access server and the client portal server at other times.

In response to receiving the signup information message 714, the primary device may transmit to the client portal server a portal request 718. The portal request 718 may include information regarding the request to initiate cellular functionality for the secondary device indicated at 702. The portal request 718 may further include the session information included in the signup information message 714. In some scenarios, the session information included in the portal request 718 may identify the communication session between the primary device and the cellular network, which may allow the client portal server to retrieve additional session information regarding the communication session from the access server (e.g., via the shared memory).

In response to receiving the portal request 718, the client portal server may transmit to the primary device portal content 720. The portal content may include code, such as HTML code or other markup language code, for presenting information regarding the cellular signup process.

In response to receiving the portal content 720, the primary device may, at 722, display the portal content to the user, e.g., in a web browser. The primary device may then receive user input 724, and pass on the user input as consent message 726.

The portal content displayed at 722 may be similar or identical in form and content to that described at 410, in connection with FIG. 4. For example, the primary device may display a graphical user interface including a list of service plans available for the secondary device and/or other information, such as contractual terms and conditions. Similarly, the user input received at 724 may be similar or identical in form and content to that described at 412. For example, the user input 724 may select one of the available service plans, accept terms and conditions, etc. Additionally, communications 722 and 724 may be iterative, in the same manner as communications 710 and 712.

However, in contrast to the example of FIG. 4, in the example of FIG. 7 the primary device may act merely as a thin client in providing this two-way interface between the client portal server and the user. For example, whereas in the example of FIG. 4, the primary device may generate a user interface based on raw information received from the access server, in the example of FIG. 7 the client portal server may generate such a user interface, and communicate code defining the user interface as the portal content 720. The primary device may then render (e.g., in a web browser) the user interface defined by the code included in the portal content 720. Similarly, the primary device may pass raw user input 724 to the client portal server as consent message 726. Thus, the primary device has no need to receive or process knowledge regarding the information presented in the user interface, such as knowledge regarding service plans.

Additionally, in this way the primary device may be largely removed from the process of activating a service plan, provisioning an eSIM to the secondary device, and/or initiating multi-SIM functionality between the primary device and the secondary device. Many of the functional steps of performing such a process may instead be carried out by the client portal server, as follows.

In some scenarios, in response to receiving the consent message 726, the client portal server may reserve and bind an eICCID of an eSIM for the secondary device. Specifically, the client portal server may transmit to the eSIM server Reserve eICCID instruction 728, which may be similar or identical to the Reserve eICCID instruction 516, as disclosed with regard to FIG. 5. In response, the eSIM server may transmit to the client portal server a Reserve ACK 730, which may be similar or identical to the Reserve ACK 518. The client portal server may then transmit to the eSIM server a Bind eICCID instruction 732, which may be similar or identical to the Bind eICCID instruction 520, and in response the eSIM server may transmit to the client portal server a Bind ACK 734, which may be similar or identical to the Bind ACK 522.

In other scenarios, the consent message 726 and/or the session information 716 may indicate that the secondary device has already been provisioned with an eSIM. In such scenarios, steps 728-734 may be omitted.

Once an eICCID has been bound for the secondary device, (e.g., in response to the Bind ACK 734), the client portal server may transmit to the HSS/TAS/billing system an Add Plan instruction 736 to activate a service plan for the secondary device and/or to initiate multi-SIM functionality between the primary device and the secondary device. The Add Plan instruction 736 may be similar or identical to the Add Plan instruction 526, except that the Add Plan instruction 736 may be passed by the client portal server to the HSS/TAS/billing system, rather than being passed by the primary device, through the access server, to the HSS/TAS/billing system, as in the example of FIG. 5.

In response to receiving the Add Plan instruction 736, the HSS/TAS/billing system may activate the selected service plan for the secondary device. For example, the HSS/TAS/billing system may add the selected service plan to an existing account associated with the primary device. Additionally, or alternatively, the HSS/TAS/billing system may initiate multi-SIM functionality between the primary device and the secondary device. For example, the HSS/TAS/billing system may map the IMSI (or other identifier) of each of the primary device and the secondary device to the same MDN. The HSS/TAS/billing system may then transmit to the access server an Activate ACK 738, acknowledging that the selected service plan has been activated and/or that multi-SIM functionality has been initiated. The Activate ACK 738 may include a URL or other address from which the eSIM associated with the bound eICCID may be downloaded.

The client portal server may, e.g., in response to receiving the Activate ACK 738, transmit to the primary device a Signup Completion ACK 740. The Signup Completion ACK 740 may acknowledge that the service plan has been activated for the secondary device and/or that multi-SIM functionality has been initiated. The Signup Completion ACK 740 may further include an indication of the bound eICCID and/or the URL or other address from which the eSIM associated with the bound eICCID may be downloaded.

Communications 742, 744, and 746 may be similar to communications 430, 432, and 434, respectively, of FIG. 4, and the description of each of communications 430, 432, and 434 may be applied, mutatis mutandis, to communications 742, 744, and 746.

As with FIG. 4, the example of FIG. 7 may be adapted to allow the secondary device to initiate its own provisioning with an eSIM.

It should be understood that FIG. 7, and the preceding description thereof, are merely exemplary, and various steps or communications may be omitted or reordered.

It should be understood that, while FIG. 7 illustrates the primary device as a smart phone and the secondary device as a smart watch, these illustrations are not intended to be limiting. The primary device and the secondary device are intended to have their full breadth of scope as defined herein.

FIG. 8—Provisioning an eSIM or Initiating Multi-SIM Using a Modified eSIM Server FIG. 8 illustrates communications 802-842, sent in connection with a communications system including a primary device, a secondary device, an access server, a telephony application server (TAS)/billing system, a client portal server, and an eSIM server. Each of the communications 802-842 may include one or more messages transmitted between the illustrated elements of the communications system. Each of the illustrated elements may be defined, and may operate, substantially as discussed with regard to FIG. 7. However, in the example of FIG. 8, the eSIM server may be further configured to perform auto-assignment of an eICCID for the secondary device.

Communications 802-810 may be similar to communications 702-710 of FIG. 7, and the description of each of communications 702-710 may be applied, mutatis mutandis, to communications 802-810.

In response to receiving the response 810, the primary device may transmit to the secondary device an eSIM Download instruction 812. The eSIM Download instruction 812 may instruct the secondary device to obtain an eSIM from the eSIM server. The eSIM Download instruction 812 may include an indication of the carrier network for which the eSIM should be operable, which may have been provided to the primary device, e.g., at 802. Because the secondary device has not yet been provisioned with an eSIM for communication on the carrier network, the primary device may, in some scenarios, transmit the eSIM Download instruction 812 via a secondary communication channel, such as a WLAN network or a short-range communication connection, such as a Bluetooth connection.

In response to receiving the eSIM Download instruction 812, the secondary device may transmit to the eSIM server an Initiate Download instruction 814, which may include an identifier of the secondary device, e.g., the CSN of the secondary device. The Initiate Download instruction 814 may further include an identifier of the primary device and/or a SIM of the primary device, and/or may also include an indication of the carrier network for which the eSIM to be provisioned for the secondary device should be operable. The Initiate Download instruction 814 may further include a list of eSIMs (e.g., a list of eICCIDs or other identifiers associated with the eSIMs) that the secondary device currently has installed.

In response to receiving the Initiate Download instruction 814, the eSIM server may determine whether an eSIM has been bound to the secondary device (e.g., whether an eICCID has been bound to a CSN or other identifier of the secondary device), but has not yet been installed in the secondary device (e.g., is not included in the list of installed eSIMs included in the Initiate Download instruction 814). In some scenarios, the eSIM server may determine more specifically whether an eSIM has been bound to the secondary device, but not installed, for use in the carrier network specified in the Initiate Download instruction 814.

If the eSIM server determines that an uninstalled eSIM has been bound to the secondary device (e.g., for use in the specified carrier network), then the eSIM server may transmit to the secondary device an eSIM Payload 818, including the eSIM bound to the secondary device. An eSIM might have been bound, for example, through the procedures shown in any of FIGS. 4-7.

If the eSIM server determines that no uninstalled eSIM has been bound to the secondary device (e.g., for use in the specified carrier network), then the eSIM server may determine whether the specified carrier network supports auto-assignment of an eICCID. If the eSIM server determines that the specified carrier network supports auto-assignment of an eICCID, then the eSIM server may, at 816, auto-assign an eICCID to the secondary device for use in the specified carrier network, without receiving an explicit reserve request or bind request. Once the eICCID has been auto-assigned to the secondary device, the eSIM server may transmit to the secondary device the eSIM Payload 818, including the eSIM associated with the auto-assigned eICCID.

In response to receiving the eSIM Payload 818, the secondary device may, at 820, store the eSIM received in the eSIM Payload 818 in an eUICC. At this stage, the secondary device has been successfully provisioned with the eSIM. However, the secondary device may not yet use the provisioned SIM for communication on the carrier network, because the eSIM may not yet be associated with an active service plan. The secondary device may also identify the eSIM to the primary device.

Once the eSIM has been provisioned to the secondary device, the primary device may transmit to the access server an initiation request 822 to initiate cellular signup for the secondary device. The initiation request 822 may be similar or identical to the initiation request 712 of the example of FIG. 7, except that the initiation request 822 may include an identifier of the provisioned eSIM (e.g., the eICCID), to inform the cellular network of the eSIM provisioned to the secondary device.

Communications 824-836 may be similar to communications 714-726 of FIG. 7, and the description of each of communications 714-726 may be applied, mutatis mutandis, to communications 824-836.

In response to receiving the portal request 826, the client portal server may transmit to the HSS/TAS/billing system an Add Plan instruction 838 to activate a service plan for the secondary device and/or to initiate multi-SIM functionality between the primary device and the secondary device. The Add Plan instruction 838 may be similar or identical to the Add Plan instruction 736.

In response to receiving the Add Plan instruction 838, the HSS/TAS/billing system may activate the selected service plan for the secondary device. For example, the HSS/TAS/billing system may add the selected service plan to an existing account associated with the primary device. Additionally, or alternatively, the HSS/TAS/billing system may initiate multi-SIM functionality between the primary device and the secondary device. For example, the HSS/TAS/billing system may map the IMSI (or other identifier) of each of the primary device and the secondary device to the same MDN. The HSS/TAS/billing system may then transmit to the access server an Activate ACK 840, acknowledging that the selected service plan has been activated and/or that multi-SIM functionality has been initiated.

The client portal server may, e.g, in response to receiving the Activate ACK 840, transmit to the primary device a Signup Completion ACK 842. The Signup Completion ACK 842 may acknowledge that the service plan has been activated for the secondary device and/or that multi-SIM functionality has been initiated.

At this point, the eSIM provisioned to the secondary device has been associated with an active service plan, and may be used for communication on the carrier network. The primary device may notify the secondary device of the successful plan activation.

As with FIG. 4, the example of FIG. 8 may be adapted to allow the secondary device to initiate its own provisioning with an eSIM.

It should be understood that FIG. 8, and the preceding description thereof, are merely exemplary, and various steps or communications may be omitted or reordered.

It should be understood that, while FIG. 8 illustrates the primary device as a smart phone and the secondary device as a smart watch, these illustrations are not intended to be limiting. The primary device and the secondary device are intended to have their full breadth of scope as defined herein.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106, a secondary device 107, or any one or more of the servers or systems illustrated in any of the figures) may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for initiating multiple-Subscriber Identity Module (multi-SIM) functionality between a first mobile device and a second mobile device in a wireless communication network, the method comprising:
by a network node in the wireless communication network:
receiving, from the first mobile device, an identifier of the first mobile device, an identifier of the second mobile device, and a request for initiation of multi-SIM functionality for the first mobile device and the second mobile device, wherein the multi-SIM functionality associates the first mobile device and the second mobile device with a shared contact address;
causing an identifier of an embedded SIM (eSIM) to be bound to the identifier of the second mobile device, the eSIM configured to support multi-SIM functionality for the first mobile device and the second mobile device;
requesting initiation by the wireless communication network of multi-SIM functionality for the first mobile device and the second mobile device;
receiving an indication that the multi-SIM functionality has been initiated for the first mobile device and the second mobile device; and
providing, to the first mobile device, the identifier of the eSIM and an indication that the multi-SIM functionality has been initiated for the first mobile device and the second mobile device.

2. The method of claim 1, wherein requesting initiation by the wireless communication network of multi-SIM functionality for the first mobile device and the second mobile device comprises requesting that the eSIM be mapped to a Mobile Directory Number (MDN) to which a SIM of the first mobile device is also mapped.

3. The method of claim 1, wherein the identifier of the eSIM comprises an embedded Integrated Circuit Card Identifier (eICCID).

4. The method of claim 1, wherein the identifier of the second mobile device comprises a Card Serial Number (CSN) of the second mobile device.

5. The method of claim 1, further comprising:
providing, to the first mobile device, a network address from which the eSIM may be downloaded.

6. The method of claim 1, wherein causing the identifier of the eSIM to be bound to the identifier of the second mobile device comprises providing a bind instruction to an eSIM server of the wireless communication network and receiving the identifier of the eSIM from the eSIM server.

7. The method of claim 1, further comprising:
requesting activation by the wireless communication network of a wireless communication service plan for the second mobile device.

8. A network node of a wireless communication network, the network node comprising:
at least one processor; and
a memory storing software instructions executable by the at least one processor to cause the network node to:
receive, from a first mobile device, an identifier of the first mobile device, an identifier of a second mobile device, and a request for initiation of multi-SIM functionality for the first mobile device and the second mobile device, wherein the multi-SIM functionality associates the first mobile device and the second mobile device with a shared contact address;
cause an identifier of an embedded SIM (eSIM) to be bound to the identifier of the second mobile device, the eSIM configured to support multi-SIM functionality for the first mobile device and the second mobile device;

request initiation by the wireless communication network of multi-SIM functionality for the first mobile device and the second mobile device;

receive an indication that the multi-SIM functionality has been initiated for the first mobile device and the second mobile device; and provide, to the first mobile device, the identifier of the eSIM and an indication that the multi-SIM functionality has been initiated for the first mobile device and the second mobile device.

9. The network node of claim 8, wherein, in requesting initiation by the wireless communication network of multi-SIM functionality for the first mobile device and the second mobile device, the software instructions are further executable to cause the network node to:

request that the eSIM be mapped to a Mobile Directory Number (MDN) to which a SIM of the first mobile device is also mapped.

10. The network node of claim 8, wherein the identifier of the eSIM comprises an embedded Integrated Circuit Card Identifier (eICCID).

11. The network node of claim 8, wherein the identifier of the second mobile device comprises a Card Serial Number (CSN) of the second mobile device.

12. The network node of claim 8, wherein the software instructions are further executable by the at least one processor to cause the network node to:

provide, to the first mobile device, a network address from which the eSIM may be downloaded.

13. The network node of claim 8, wherein, in causing the identifier of the eSIM to be bound to the identifier of the second mobile device, the software instructions are further executable to cause the network node to:

providing a bind instruction to an eSIM server of the wireless communication network and receiving the identifier of the eSIM from the eSIM server.

14. The network node of claim 8, wherein the software instructions are further executable by the at least one processor to cause the network node to:

request activation by the wireless communication network of a wireless communication service plan for the second mobile device.

15. A non-transitory computer-readable memory medium storing software instructions executable by a processor of a network node in a wireless communication network to cause the network node to:

receive, from a first mobile device, an identifier of the first mobile device, an identifier of a second mobile device, and a request for initiation of multi-SIM functionality for the first mobile device and the second mobile device, wherein the multi-SIM functionality associates the first mobile device and the second mobile device with a shared contact address;

cause an identifier of an embedded SIM (eSIM) to be bound to the identifier of the second mobile device, the eSIM configured to support multi-SIM functionality for the first mobile device and the second mobile device;

request initiation by the wireless communication network of multi-SIM functionality for the first mobile device and the second mobile device;

receive an indication that the multi-SIM functionality has been initiated for the first mobile device and the second mobile device; and provide, to the first mobile device, the identifier of the eSIM and an indication that the multi-SIM functionality has been initiated for the first mobile device and the second mobile device.

16. The non-transitory computer-readable memory medium of claim 15, wherein the requesting initiation by the wireless communication network of multi-SIM functionality for the first mobile device and the second mobile device comprises requesting that the eSIM be mapped to a Mobile Directory Number (MDN) to which a SIM of the first mobile device is also mapped.

17. The non-transitory computer-readable memory medium of claim 15, wherein the identifier of the eSIM comprises an embedded Integrated Circuit Card Identifier (eICCID).

18. The non-transitory computer-readable memory medium of claim 15, wherein the software instructions are further executable to cause the network node to:

provide, to the first mobile device, a network address from which the eSIM may be downloaded.

19. The non-transitory computer-readable memory medium of claim 15, wherein causing the identifier of the eSIM to be bound to the identifier of the second mobile device comprises providing a bind instruction to an eSIM server of the wireless communication network and receiving the identifier of the eSIM from the eSIM server.

20. The non-transitory computer-readable memory medium of claim 15, wherein the software instructions are further executable to cause the network node to:

request activation by the wireless communication network of a wireless communication service plan for the second mobile device.

* * * * *